US010942973B2

(12) United States Patent
Amdur et al.

(10) Patent No.: US 10,942,973 B2
(45) Date of Patent: Mar. 9, 2021

(54) AUTOMATICALLY GENERATING AND EVALUATING CANDIDATE TERMS FOR TRADEMARK CLEARANCE

(71) Applicant: CORSEARCH, INC., New York, NY (US)

(72) Inventors: Brett M. Amdur, Havertown, PA (US); Guy F. Coene, East Flanders (BE)

(73) Assignee: CORSEARCH, INC., New York, NY (US)

( * ) Notice: Subject to any disclaimer, the term of this patent is extended or adjusted under 35 U.S.C. 154(b) by 124 days.

(21) Appl. No.: 15/600,724

(22) Filed: May 20, 2017

(65) Prior Publication Data

US 2018/0336285 A1 Nov. 22, 2018

(51) Int. Cl.
| *G06F 16/9038* | (2019.01) |
| *G06Q 50/18* | (2012.01) |
| *G06F 16/14* | (2019.01) |
| *G06F 16/332* | (2019.01) |
| *G06F 16/35* | (2019.01) |
| *G06F 3/048* | (2013.01) |

(52) U.S. Cl.
CPC ........ *G06F 16/9038* (2019.01); *G06F 16/144* (2019.01); *G06F 16/3322* (2019.01); *G06F 16/358* (2019.01); *G06Q 50/184* (2013.01); *G06F 3/048* (2013.01)

(58) Field of Classification Search
CPC .. G06F 16/144; G06F 16/3322; G06F 16/358; G06F 16/9038; G06F 3/048; G06Q 50/184
USPC ................................................. 707/600–899
See application file for complete search history.

(56) References Cited

U.S. PATENT DOCUMENTS

| 7,346,605 | B1 | 3/2008 | Hepworth et al. |
| 7,516,416 | B2 | 4/2009 | Viswanathan et al. |
| D614,192 | S | 4/2010 | Takano et al. |
| 8,346,548 | B2 | 1/2013 | Owen |

(Continued)

FOREIGN PATENT DOCUMENTS

| WO | WO-2002099694 A1 | 12/2002 |
| WO | WO-2010003286 A1 | 1/2010 |

OTHER PUBLICATIONS

Wayback Machine archive: UPTO Trademark Electronic Search System (TESS) screenshot on Nov. 23, 2016 (Year: 2016).*

(Continued)

*Primary Examiner* — Irete F Ehichioya
*Assistant Examiner* — Xiaoqin Hu
(74) *Attorney, Agent, or Firm* — Notaro, Michalos & Zaccaria P.C.

(57) ABSTRACT

A technique for generating and evaluating candidate trademarks includes providing a user interface so that a user can specify various criteria via respective interactive controls. The technique further includes searching one or more databases to identify lexical units related to the criteria, applying a set of combination rules to the identified lexical units to generate candidate trademark terms, including calculating respective relationship scores indicative of how closely the candidate trademark terms satisfy the criteria, ranking the candidate trademark terms based on the relationship scores to generate an ordered list, and providing the ordered list of the candidate trademarks and indications of the respective relationship scores via the user interface.

21 Claims, 20 Drawing Sheets

(56) References Cited

U.S. PATENT DOCUMENTS

| | | | |
|---|---|---|---|
| 8,392,443 B1* | 3/2013 | Allon | G06F 16/3338 707/765 |
| D684,585 S | 6/2013 | Plesnicher et al. | |
| D685,813 S | 7/2013 | Bork et al. | |
| 8,589,786 B2 | 11/2013 | Johnston | |
| D697,080 S | 1/2014 | Scholz et al. | |
| D719,176 S | 12/2014 | Cohen et al. | |
| D719,177 S | 12/2014 | Cohen et al. | |
| 8,935,229 B1 | 1/2015 | Ritchey | |
| D732,555 S | 6/2015 | Schoger et al. | |
| D733,167 S | 6/2015 | Schoger et al. | |
| D765,672 S | 9/2016 | Raff et al. | |
| D769,287 S | 10/2016 | Lirov et al. | |
| D772,941 S | 11/2016 | Nuovo et al. | |
| D781,905 S | 3/2017 | Nakaguchi et al. | |
| D782,515 S | 3/2017 | Dzjind et al. | |
| D783,046 S | 4/2017 | Dzjind et al. | |
| D783,680 S | 4/2017 | Gauci et al. | |
| D786,273 S | 5/2017 | Herman et al. | |
| D792,894 S | 7/2017 | Dzjind et al. | |
| D794,675 S | 8/2017 | Liu et al. | |
| D797,792 S | 9/2017 | Patterson et al. | |
| D798,884 S | 10/2017 | Kaasalainen et al. | |
| 2002/0042784 A1 | 4/2002 | Kerven et al. | |
| 2003/0158743 A1 | 8/2003 | Havlick et al. | |
| 2003/0171949 A1 | 9/2003 | Degnan et al. | |
| 2004/0220903 A1 | 11/2004 | Shah et al. | |
| 2004/0230568 A1 | 11/2004 | Budzyn | |
| 2005/0120868 A1* | 6/2005 | Hinman | G10H 1/0041 84/615 |
| 2005/0289473 A1 | 12/2005 | Gustafson et al. | |
| 2008/0046412 A1 | 2/2008 | Lee et al. | |
| 2008/0065611 A1 | 3/2008 | Hepworth et al. | |
| 2009/0031217 A1* | 1/2009 | Tysbo | G06F 17/27 715/256 |
| 2009/0228476 A1 | 9/2009 | Luther | |
| 2009/0299731 A1* | 12/2009 | Owen | G06F 16/3343 704/9 |
| 2010/0229130 A1 | 9/2010 | Edge et al. | |
| 2011/0047166 A1 | 2/2011 | Stading et al. | |
| 2011/0246452 A1 | 10/2011 | Johnston | |
| 2012/0144499 A1* | 6/2012 | Tan | G06Q 10/00 726/26 |
| 2014/0096078 A1 | 4/2014 | Prior | |
| 2014/0280104 A1* | 9/2014 | Summerfield | G06Q 50/184 707/724 |
| 2015/0066921 A1* | 3/2015 | Freimuth | G06F 40/274 707/730 |
| 2015/0269646 A1* | 9/2015 | Borges | G06O 30/0631 705/26.63 |
| 2015/0324469 A1* | 11/2015 | Keyngnaert | G06F 16/33 707/706 |
| 2015/0370465 A1* | 12/2015 | Green | G06F 16/955 715/739 |
| 2016/0132979 A1* | 5/2016 | Schneller | G06Q 10/0635 705/310 |
| 2016/0260033 A1* | 9/2016 | Keyngnaert | G06Q 10/063 |
| 2017/0322983 A1 | 11/2017 | Anderson | |

OTHER PUBLICATIONS

Andrews et al., Search result visualisation with xFIND, User Interfaces to Data Intensive Systems, Proceedings of Second International Workshop UIDIS 2001 (May 31-Jun. 1, 2001).

Nguyen et al., A novel visualization model for web search results, IEEE Trans. on Visualization and Computer Graphics, IEEE Service Center, Los Alamitos, California, vol. 12, No. 5, pp. 981-988 (Sep. 1, 2006).

Nowell et al., Visualizing search results, Proceedings of the 19th Annual International ACM SIGIR Conference on Research and Development in Information Retrieval (Aug. 18-22, 1996).

International Search Report and Written Opinion for corresponding International Application No. PCT/US2018/033351, dated Jul. 31, 2018.

USPTO, Basic Facts About Trademarks (relevant portion).

* cited by examiner

Results Review: Name Families

| Saved to Project | Name | Proximity Score | Clearance Likelihood | Reaction | Notes |
|---|---|---|---|---|---|
| | Pup Palace | 94 | ● | | |
| | Pooch Pad | 86 | ● | | |
| | Canine Quarters | 27 | ○ | | |

FIG. 17

Results Review: Name Families

| Saved to Project | Name | Proximity Score | Clearance Likelihood | Reaction | Notes |
|---|---|---|---|---|---|
| | Mongrel Prison | 92 | ● | | |
| | ... | | | | |
| | ... | | | | |
| | Doberman Dungeon | 86 | ● | | |
| | ... | | | | |
| | ... | | | | |
| | Mutt Hut | 02 | ○ | | |
| | ... | | | | |
| | ... | | | | |

*FIG. 19*

FIG. 20 ions and methods for automatically generating sets of one or more lexical terms and evaluating the likelihood of clearing these sets of lexical terms for use as trademarks.

AUTOMATICALLY GENERATING AND EVALUATING CANDIDATE TERMS FOR TRADEMARK CLEARANCE

FIELD OF THE DISCLOSURE

The following disclosure generally relates to systems and methods for automatically generating sets of one or more lexical terms and evaluating the likelihood of clearing these sets of lexical terms for use as trademarks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When looking for a suitable trademark for a good or service, a decision maker chooses an existing word or phrase or, more typically, invents a new word or phrase, and attempts to determine whether the word or phrase is likely to clear. Today, the trademark legal clearance and protection industry today suffers from inefficiencies and inaccuracies due to large amount of available information. For example, before being able to make an informed decision, the decision maker typically must search through one or several databases and reviews a large number of search results proximate to the word or phrase being considered.

Although certain software tools are available to assist decision makers with clearing candidate trademarks, these tools usually implement serial data review techniques (spreadsheets, lists, full records, etc.), which is daunting for a large set of search results. More particularly, these presentation techniques generally require that the user traverse numerous generations of screens to collect all the necessary information. Moreover, the existing systems do not allow the user to simultaneously review multiple, mutually independent factors when reviewing results during trademark clearance.

Further, to the extent that the available software tools improve the process of reviewing search results for a certain word or phrase, these tools at best support an iterative process whereby a decision maker invents a word or phrase, uses the tools to review the search results, and invents a new word or phrase if the search results are unsatisfactory. A decision maker in a typical scenario thus navigates a large number of screens and enters numerous commands via the user interface before arriving at an acceptable result. Still further, the software tools today do not provide efficient interfaces for visualizing namespaces relevant to the word or phrase being considered, much less for visualizing namespaces in relation to additional parameters such as owners.

In short, the existing solutions suffer from low usability, accuracy, and speed.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The techniques of this disclosure reduces the number of software operations required to generate and estimate the likelihood of clearing a candidate trademark, as well the number of operator actions and operator time, by automatically generating trademark suggestions based on a set of user-specified criteria and calculating scores indicative of proximity of the suggestions to the user-specified criteria as well as scores indicative of the likelihood of successfully registering the trademark. An example system of this disclosure implements various controls for efficiently selecting namespaces, criteria, scoring categories, etc. as well as various visualization techniques for inspecting namespaces.

One example implementation of these techniques is a method for automatically providing trademark suggestions, implemented by one or more processors. The method includes providing a user interface for specifying several of criteria via respective interactive controls, searching one or more databases to identify lexical units related to the several criteria, applying a set of combination rules to the identified lexical units to generate candidate trademark terms (including calculating respective relationship scores indicative of how closely the candidate trademark terms satisfy the several criteria), ranking the candidate trademark terms based on the relationship scores to generate an ordered list, and providing the ordered list of the candidate trademarks and indications of the respective relationship scores via the user interface.

In various implementations, the method can implement one or more of the following additional features. Applying the set of combination rules to the identified lexical units to generate the candidate trademark terms further includes automatically retrieving, from the one or more databases, indications of existing trademark terms related to the several criteria, and calculating existing trademark proximity scores for the candidate trademark terms relative to the existing trademark terms to determine likelihoods of clearance, so that ranking the candidate trademark terms is further based on the determined likelihoods of clearance. The method further includes receiving, via the user interface, user feedback regarding at least some of the candidate trademarks; and re-executing at least some of the searching, the applying, or the ranking steps in view of the user feedback. Providing the user interface for specifying the several criteria includes providing interactive controls for specifying relative weights of the criteria (additionally or alternatively, the weights of the criteria are derived automatically based on user feedback received via the user interface using machine-learning techniques, for example). The method further includes receiving an alphanumeric term via one of the interactive controls, so that calculating the relationship score for a certain one of the candidate trademark terms includes generating a similarity metric based on linguistic relationship between the candidate trademark term and the received alphanumeric term. Further, the linguistic relationship in some implementations is based on one or more of (i) structural similarity (e.g., visual), (ii) language similarity (e.g., phonetic, inflectional), (iii) conceptual similarity (e.g., semantic based on synonyms, antonyms, hypernyms, other associated terms). Providing the user interface for specifying the several criteria includes providing an interactive control for specifying a concept, so that searching the one or more databases includes searching for the lexical units corresponding to the specified concept. Providing the user interface for specifying the several criteria includes providing an interactive control for specifying a sentiment, so that searching the one or more databases includes searching for the lexical units corresponding to the specified sentiment. Providing the user interface for specifying the several criteria includes providing an interactive control for specifying a stem for inclusion in the candidate trademark terms, so that applying the set of combination rules to the identified lexical units includes merging the specified stem with the identified lexical units. Providing the user interface for specifying the several criteria includes providing an interactive control for specifying a level of pronounceability, so that calculating the respective relationship scores includes calculating pronounceability metrics. Providing the user interface for specifying the several criteria includes providing an interactive controls for specifying an industry, so that the generated candidate trademark terms are related to the specified industry (e.g., the candidate trademark terms can be evaluated based on how close these terms appear to be related to the soft-drink industry, car industry, golf industry). Providing the user interface for specifying the several criteria includes providing an interactive controls for specifying a trademark portfolio, so that the generated candidate trademark terms are related to the specified portfolio (e.g., to make the candidate trademark terms resemble the existing trademarks in the portfolio in terms of structure, sound, concept, etc.). Providing the user interface for specifying the several criteria includes providing an interactive controls for specifying a structure of the candidate trademark term (e.g., a single three-syllable word, two words with any number of syllables, a sequence of three separate syllables). Generating the candidate trademark terms includes using existing words, one or more lexical units that do not have an established meaning in language, or both.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 9 is a diagram of another example user interface screen for specifying creation criteria and viewing clearance estimates for candidate trademarks, which can be provided via a display of the client device of FIG. 1;

FIGS. 13-20 illustrate an example sequence of user interface screens the system of FIG. 1 can present to a user via the display of the client device when generating and evaluating candidate trademarks; in particular:

FIG. 13 illustrates an example user interface screen via which a user can begin to build a query for candidate trademarks, FIG. 14 illustrates an example user interface screen via which the user can specify certain criteria, FIG. 15 illustrates an example user interface screen via which the system can provide proximity scores and likelihood of clearance scores, in response to the user input, FIG. 16 illustrates an example user interface screen via which the user can specify an owner to be used as an additional constraint, FIG. 17 illustrates an example user interface screen via which the system can provide adjusted proximity scores and likelihood of clearance scores responsive to the additional user input, FIG. 18 illustrates an example user interface screen via which the user can changes the initially provided sentiment, FIG. 19 illustrates an example user interface screen via which the system can provide adjusted proximity scores and likelihood of clearance scores responsive to the additional user input, and FIG. 20 illustrates an example user interface screen via which the user can provide feedback in the form of respective reaction scores for one or several candidate trademarks.

DETAILED DESCRIPTION

Overview

As discussed below with reference to FIGS. 1-14, the system and methods of this disclosure reduce the number of software operations required to create and estimate the likelihood of clearing a candidate trademark, as well the number of operator actions and operator time, by automatically generating trademark suggestions based on a set of user-specified criteria and calculating scores indicative of proximity of the suggestions to the user-specified criteria as well as scores indicative of the likelihood of successfully registering the trademark. The criteria can include a concept (e.g., "protection"), sentiment ("happy"), structure ("phonetic match"), etc. In addition to selections corresponding to the criteria, such as "protection," "confidence," and "phonetic match," the system can receive selections of weights to be applied to each of the criteria (or derive these weights based on user feedback).

The system can automatically generate lexical units, such as multi-part words conforming to certain rules of construction but not necessarily having any already-established meaning, and assess the overall proximity to the set of criteria. Depending on the implementation, the system can use electronic thesaurus dictionaries or implement machine learning to determine relationships between concepts. For example, the system can analyze a corpus of texts to train a neural network with related concepts based on how often certain terms appear next to each other in the text, to derive semantic relatedness from co-occurrence patterns.

The system also can automatically query a database storing the existing trademarks to determine proximity to the existing trademarks and assess the likelihood of clearing the trademarks for use. These metrics of proximity can be used to rank the suggested trademark terms. For example, the system can provide an interactive listing of trademark terms suggestions and specify, for each suggestion, a proximity score indicative of how well the suggestion matches the user-specified criteria and a clearance likelihood score indicative of how close the suggestion is to the existing trademarks. The clearance likelihood score essentially is a proximity score evaluated relative to the existing trademarks.

In some implementations, the system can also generate a visual map illustrating certain relationships in terms of clusters. For example, the system can depict the "whitespace" within the trademark namespace in the form of name/term clusters visually differentiated from the name/term clusters owned by others.

These and other techniques discussed below can improve the accuracy of suggestions and evaluating the likelihood of clearance, improve the speed of navigating various screens, improve the usability of the system, and provide other technical advantages.

Example Computing Environment

Figure 1:
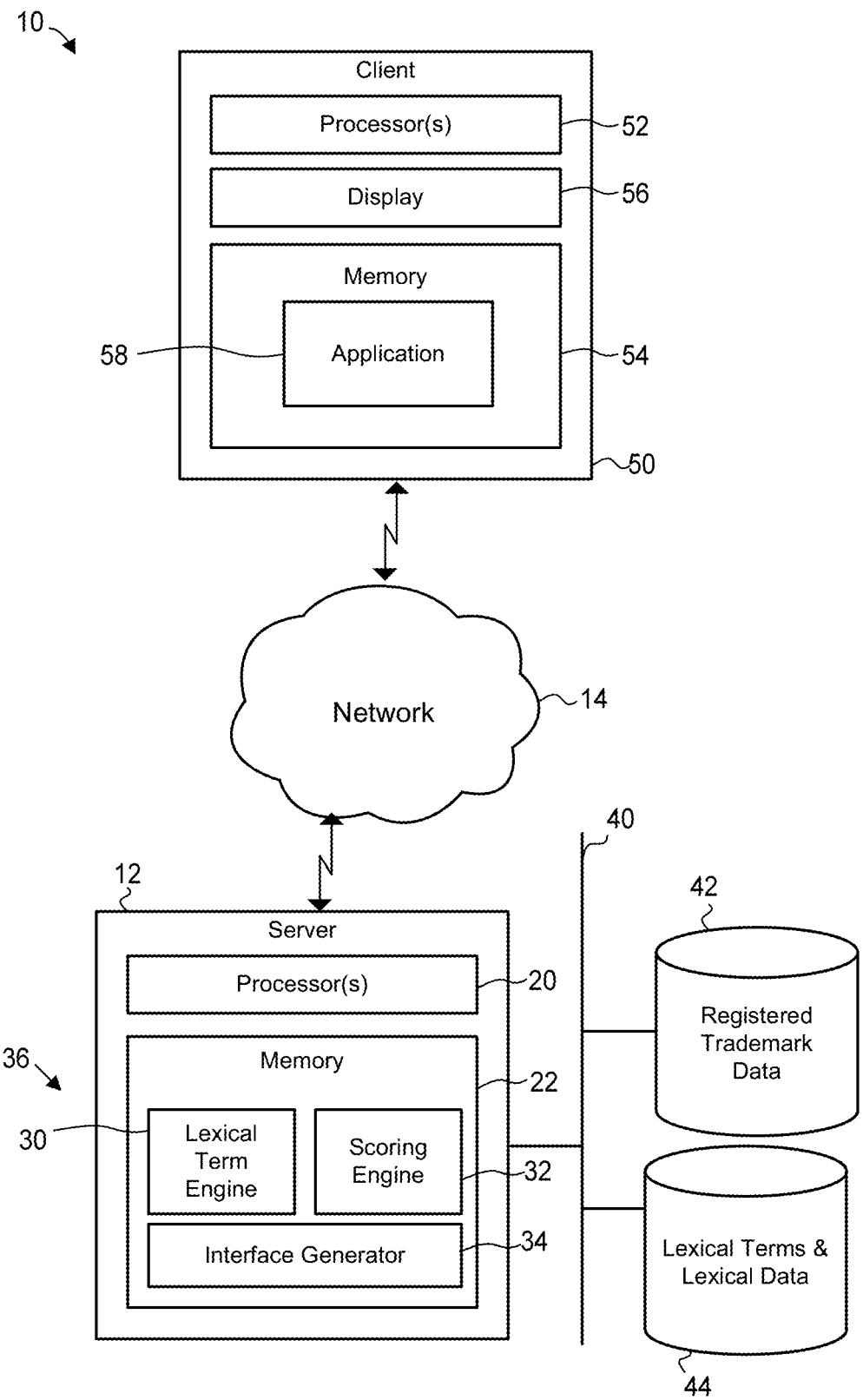
FIG. 1 is a block diagram of a system in which techniques for automatically generating and evaluating candidate trademark terms can be implemented.

Referring first to FIG. 1, an example computing system 10 includes a server system 12 which can include one or more servers communicatively coupled to a communication network 14. The server system 12 includes one or more processing units 20 and a memory 22, which can be implemented as one or several units with non-transitory computer-readable medium, residing in the same device as the one or more processing units 20 in separate devices. In general, the components 20 and 22 can be implemented in a single device or distributed among multiple devices in any suitable manner.

The memory 20 stores respective sets of instructions that implement a lexical term engine 30, a scoring engine 32, and an interface generator 34. The components 30, 32, and 34 may operate as parts of a system for generating and evaluating candidate trademarks 36 (for simplicity, "the system 36"). As discussed in more detail below, the lexical term engine 30 can implement various combination rules to generate candidate trademark terms using component lexical units, for example; the scoring engine 32 can implement various scoring techniques to generate numeric scores that indicate how well a candidate trademark term conveys the desired meaning and how the candidate trademark compares to the existing trademarks (or generic terms that affect the likelihood of clearing the candidate trademark); and the interface generator 34 generates various interactive controls for specifying criteria using which the lexical term engine 30 generates candidate trademark terms, specifying criteria weights, etc. along with visualizations of the search results and the corresponding ranking, namespaces, indicators of the clearance likelihood, etc.

In an example implementation, the server 20 is communicatively coupled to a registered trademark database 42 and a lexical database 44 via a communication link 40, for example. The communication link 40 can be wired or wireless and operate as part of a local area network (LAN) or a wide area network, for example. The databases 42 and 44 can be electronic databases implemented in any suitable manner, e.g., using a set of tables interconnected by indices to define relational databases. In various implementations, the databases 42 and 44 can be combined into a single database or, conversely, be separated into more than two databases. Further, in some implementations, the databases 42 and 44 reside in the memory 22 of the server system 12.

The registered trademark database 42 can store information regarding registered trademarks for one or multiple jurisdictions. This information may include serial numbers, terms of word marks, indicators of goods and service classes, filing dates, ownership information, live/dead indicators, temporal trends in trademark registration (e.g., "malt" and "hops" occur more frequently in the past 12 months), etc. In some implementations, the registered trademark database 42 can be an external database maintained by a government or private entity, and accessible via an appropriate application programming interface (API).

The lexical database 44 can store existing words in one or several languages and synonyms in one or several languages in the format of a thesaurus. The lexical database 44 in an example implementation also can store a graph linking concepts and inflections or, more generally, any other suitable machine-learning model of relationships between terms. In some implementations, the lexical database 44 can store indications of how words in one language can be translated into another language. Alternatively, the lexical term engine 30 can query external databases or online services to request translation of a term into one or more foreign languages.

Further, the lexical database 44 can store indications of conceptual relationships that link terms that are not necessarily synonymous. For example, the lexical database 44 can store an indication that the concept "elephant" is linked to such terms and/or concepts as "African," "animal," "zoo," "Asian," "mouse," "trunk," "lion," "species," "ear," "ivory," "manatee," "extinct," "tusk," "circus," "wild," etc. As another example, the lexical database 44 can store data linking the concept "Jedi" to "war," "star," "power," "force," "knight," "game," "Sith," "fight," "republican," "Yoda," "episode," "empire," "religion," etc. As yet another example, the concept "gaming" can be linked in the lexical database 44 to such words or concepts as "play," "fun," "entertainment," "computer," "competitive," etc.

To generate the conceptual relationships, the lexical term engine 30 can process text from various sources. For example, the lexical term engine 30 can determine that an article describing a trivia DVD game includes the term "fun" and, similarly, a certain number of sources reference "fun" and "game" in the same document, and accordingly link the concepts of "fun" and "game."

Still further, the lexical database 44 can store descriptions of combination rules for combining words existing in a language or lexical units in general. For example, one combination rule can specify how two lexical units can be combined (e.g., to avoid long sequences of vowels or consonants). In some implementations or configurations, the lexical database 44 can implement rules specific to a certain industry. For example, trademark names for drugs can include references to the chemical components, and the lexical term engine 30 can apply a certain combination rule to generate a candidate trademark that references the name of the chemical component in the prefix, suffix, postfix, etc.

The lexical database 44 in some implementations also can store a pronounceability model that estimates pronounceability data for words and/or syllables. The pronounceability model can specify how difficult it is to pronounce certain combinations of letters, syllables, and words. In some implementations, the pronounceability model can provide estimates for particular languages, regions (e.g., Australia and, separately, Canada), etc. The lexical term engine 30 can apply the pronounceability data when scoring a candidate trademark.

With continued reference to FIG. 1, a client computing device 50 can operate in the computing system 10 to access the server system 12. The client computing device 50 can be any suitable portable or non-portable computing device such as a laptop computer, a smartphone, a desktop computer, etc. The client computing device 50 can include one or more processors 52, a display 45, and non-transitory computer-readable memory 54.

The memory 54 can store an application 58, which can be a web browser or a special-purpose application for generating and evaluating candidate trademarks. The application 58 can provide an interactive user interface in accordance with the instructions received by the server 12. For example, the interface generator 34 can provide to the client computing device 50 instructions in a mark-up language, one or more scripting languages, etc.

In example operation, a user launches the application 58 (in this case, a web browser), specifies the URL of the server system 12, and provides authentication information via the user interface provided on the display 56. The user then specifies various criteria for obtaining one or more candidate trademarks. The lexical term engine 30 in response generates candidate trademark terms, the scoring engine 32 scores these candidate trademark terms, and the interface generator 34 provides appropriate visualizations.

Example Method for Generating Trademark Suggestions

Figure 2:
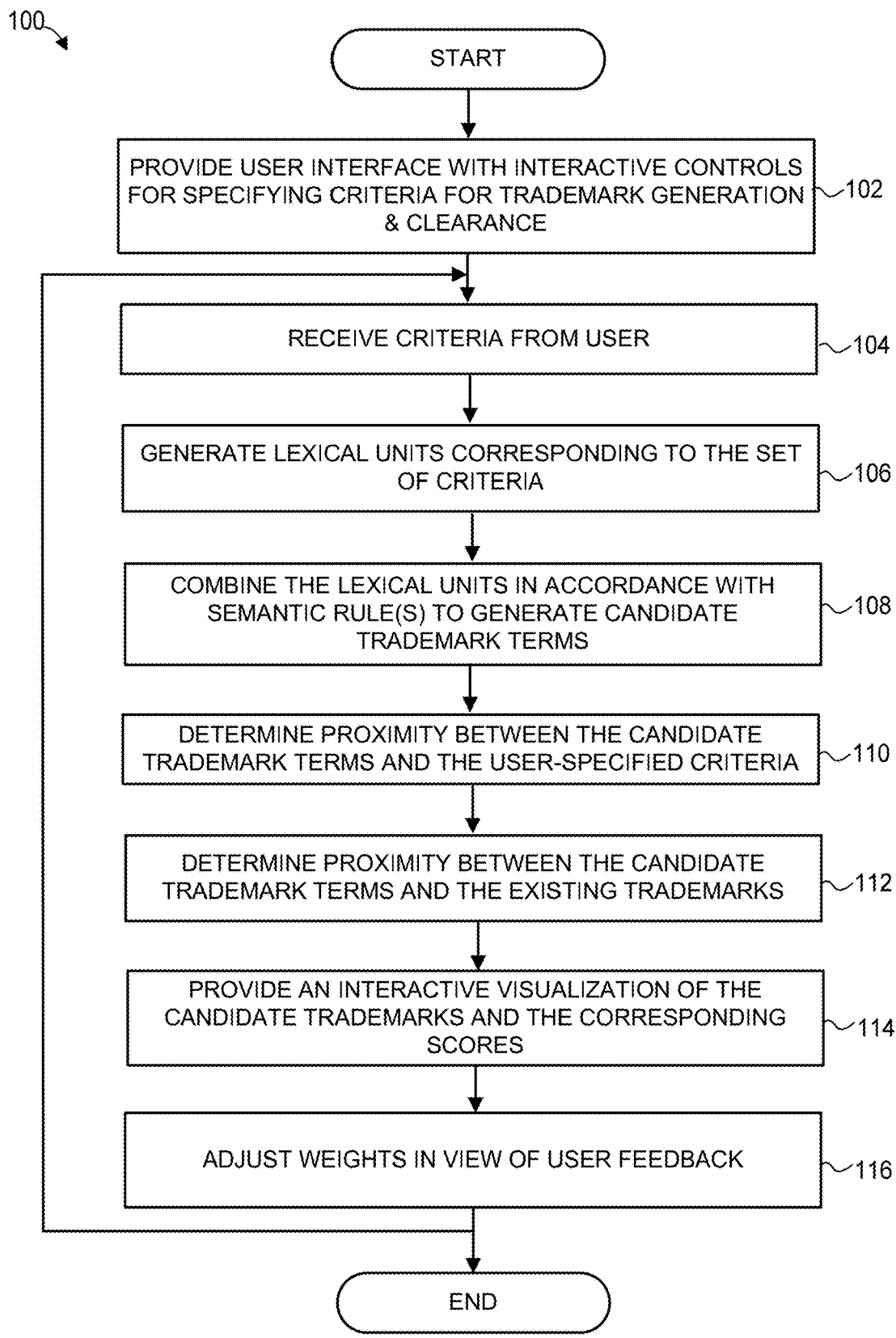
FIG. 2 is a flow diagram of an example method for providing candidate trademark terms via an interactive user interface, which can be implemented in the system of FIG. 1.

FIG. 2 is a flow diagram of an example method 100 for providing candidate trademark terms via an interactive user interface. The method 100 can be implemented in the server system 12 of FIG. 1, for example. In some implementations, the steps of the method 100 may be distributed between the server system 12 and the client computing device 50. Although the method 100 in general can be implemented in any suitable computing system, blocks 102-114 are discussed below with reference to the system 10 of FIG. 1.

At block 102, a user interface with interactive user interface is provided to a user. Several screens of example user interfaces are illustrated in FIGS. 8-14 and discussed below. The user interface may be provided via the display of a client device. In some implementations, the user interface is defined by a web page content provided by the server system 12. In another implementation, the user interface is provided by the application 58 installed on the client computing device 50.

At block 104, user criteria are received from the user. These criteria generally affect the proximity score (i.e., the score the scoring engine 32 calculates to indicate how close a suggested trademark is to the user's goal), the clearance score (e.g., the score the scoring engine 32 calculates to indicate how likely the candidate trademark is to clear), or both. The user interface in one example implementation (see FIG. 8) can allow the user to specify criteria for candidate trademark creation and separately for clearance. In some cases, the user can specify criteria of the same type for creation and clearance.

In an example scenario, the user specifies, as one criterion, the word "mimic" and indicates that this word should be applied as a concept. The user then assigns a certain weight to this criterion. In some cases, the system 36 automatically adjusts the weights based on user feedback. For example, the system 36 can initially assign neutral, identical weights to all user-specified criteria, and then adjust these weights in response to the user assigning the relatively high score of 90 to one candidate trademark, the relatively low score of 20 to another candidate trademark, etc. The user further specifies, as another criterion, a certain stem (e.g., "STAT") to be included in candidate trademark. The user also specifies, as yet another criterion, the minimum metric of pronounceability (e.g., 80%). The final criterion the user specifies in this example is structure, e.g., the candidate trademarks has two separate words. The user operates an appropriate control to submit these criteria to the server system 12, and the flow proceeds to block 106. In another example, the user at block 14 enters the word "happy" and specifies that this criterion should be applied as a sentiment rather than as a concept. In this case, the lexical term engine 30 attempts to select lexical units that may convey the sentiment of anger. In another example, the user at block 14 enters "Acme, Inc." and specifies that this criterion is to be applied as an owner. The system 36 in general can be configured to receive any suitable criterion or a set of criteria. As yet another example, the user can specify a certain good or service (e.g., "beer") to request that the candidate trademarks be further evaluated for relevance to beer.

At block 106, lexical units corresponding to the set of specified criteria are generated in response to the criteria received at block 104. Referring back to FIG. 1, the lexical term engine 30 can retrieve appropriate lexical units from the lexical database 44. As one example, the lexical term engine 30 can retrieve the terms "fluffy" and "ursine" when the user specifies a combination of concepts "build" and "bear" as "build a bear" (see also the discussion of example conceptual relationships, above). In general, the user can specify a single concept or several concepts at block 104.

The flow then proceeds to block 108, where the lexical terms are combined in accordance with the relevant combination rules. The lexical term engine 30 can implement a set of language-specific combination rules specific to the language, so as to ensure the candidate trademarks conform with the general expectations of the speakers of the language. In some implementations, some of the combination rules can specified by the user. As one example, the lexical term engine 30 obtains the word "fluffy" as a term conceptually linked to the combination of building a bear, selects this term from among similar terms upon determining that this term is linked to the sentiment "happy" specified by the user as another criterion, and generates the phrase "fluffy warehouse" as a two-word suggestion, in accordance with the user-specified criterion that the candidate trademark include two words. In a similar manner, the lexical term engine 30 can generate a certain number of candidate trademarks (e.g., 10, 50, 100).

Next, the flow proceeds to block 110, where proximity between the candidate trademarks and the user's perceived target is evaluated to generate proximity scores. For example, the scoring engine 32 can calculate the proximity score for a certain candidate trademark based on how closely the candidate trademark corresponds to the user-specified criteria. Then, at block 112, proximity between the candidate trademarks and the existing trademarks is evaluated to generate clearance likelihood scores. The scoring engine 32 can calculate the likelihood that a certain candidate trademark will clear based on a number of factors. Scoring techniques applicable to blocks 110, 112, or both are discussed in more detail below with reference to FIGS. 3-5.

The flow then proceeds to block 114, where an interactive visualization of the candidate trademarks and the corresponding scores is generated. In an example implementation, the interface generator 34 displays a list of candidate trademarks ranked based on the proximity scores, with icons of a certain color indicating the determined likelihood of clearance. As a more specific example, the interface generator 34 can display a green icon to indicate that the likelihood of clearance is above 90% and a yellow icon to indicate that the likelihood of clearance is above 75% but below 90%. These and additional visualization techniques are further discussed below with reference to FIGS. 8-20.

Figure 20:
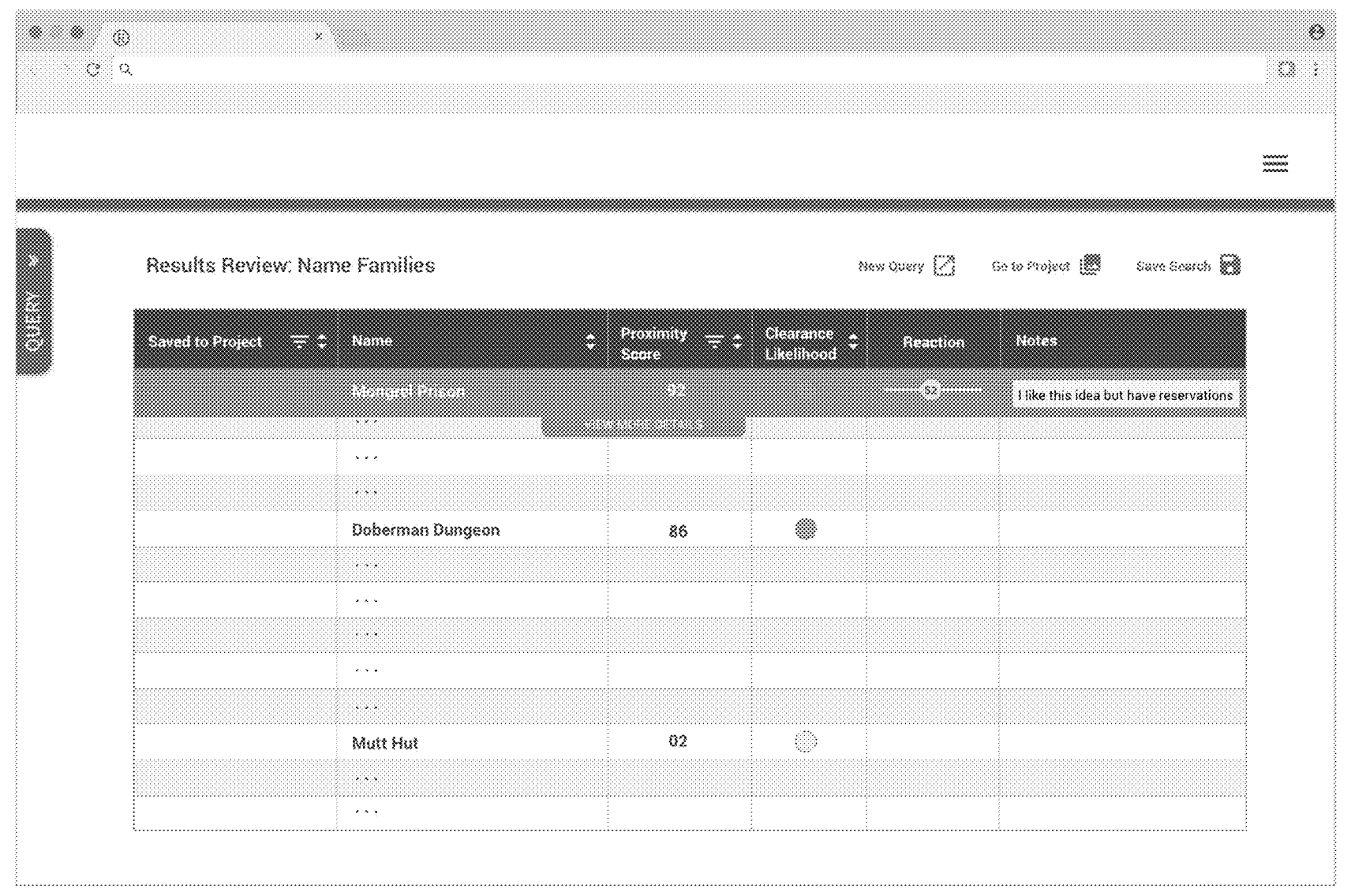

Next, at block 116, the user can provide feedback regarding some or all of the candidate trademarks. For example, as illustrated in FIG. 20 (see below), the system 36 can provide an interactive control via which the user can specify a reaction score as a numerical value between 0 and 100. More generally, the system 36 can receive feedback in any suitable format. The system 36 can adjust some of the criteria weights in view of the user feedback, and the flow can return to block 104 to generate new candidate trademarks. If desired, the user can supply additional criteria or remove some of the previously supplied criteria.

For example, the system 36 initially can identify a relatively large semantic neighborhood for the user-specified concept of "animal." This neighborhood can encompass such related concepts as "cat," "dog," "snake," etc. In response to low reaction scores from the user for such terms as "cobra," "viper," etc., the system 36 can narrow the semantic neighborhood to eliminate the concept of "snake." In a similar manner, the system can iteratively reduce the scope of other user-specified criteria (unless the user decides to pivot and entirely changes some of the criteria, for example).

Example Scoring Techniques

Figure 3:
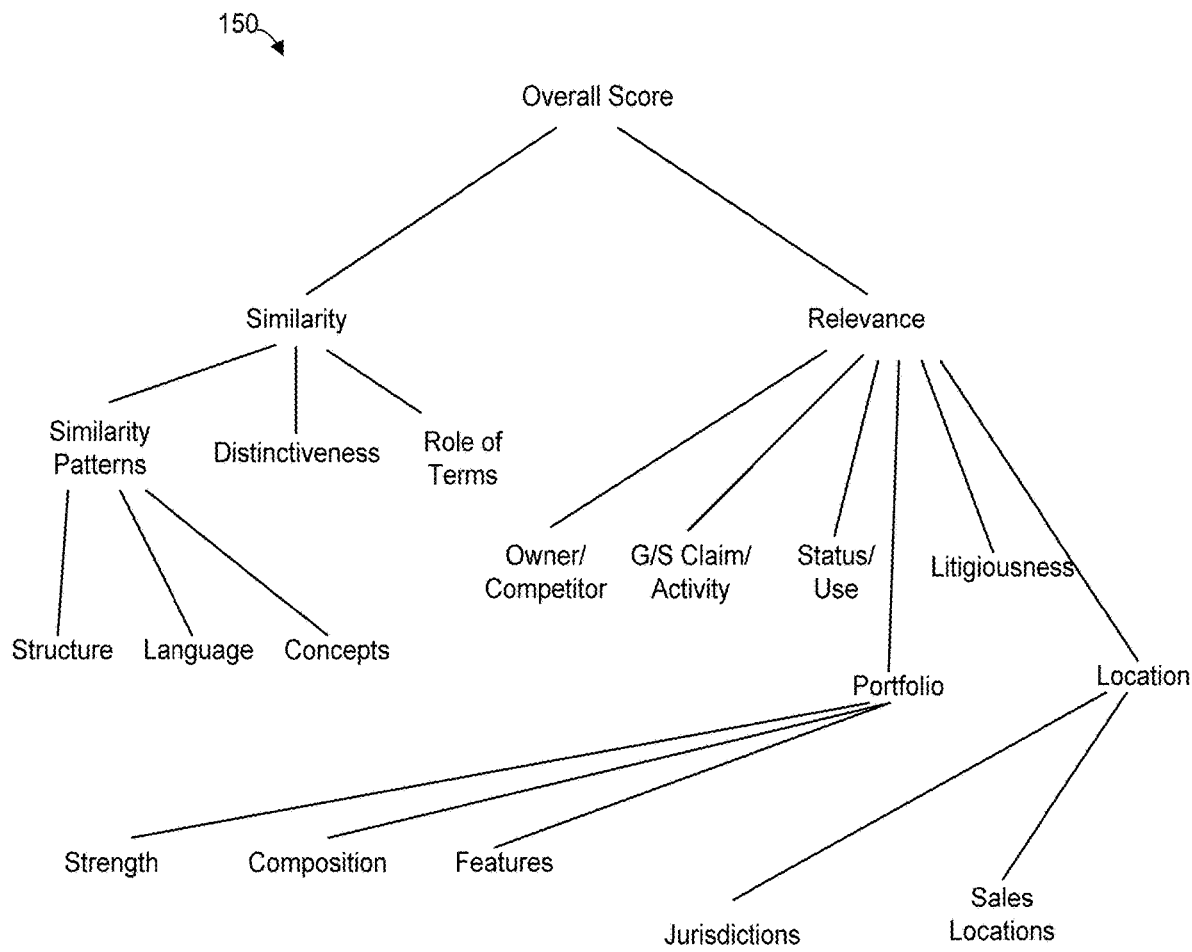
FIG. 3 is a conceptual diagram of example factors that can be used to calculate a score indicative of a relationship between two linguistic terms potentially used as trademark, which can be used in the system of FIG. 1.

A conceptual diagram 150 of FIG. 3 an example composition of a score which the scoring engine 32 can generate as a proximity scores and/or a clearance likelihood score. The overall score in this example is a numeric metric generated based on a numeric metric of similarity and a numeric metric of relevance. The metric of similarity is generated based on measurements of similarity patterns, distinctiveness, and specified roles of terms. The metric of relevance is generated based on several component scores, as illustrated in FIG. 3. In general, the scoring engine 32 need not use every component for each score, and can use any suitable subset of the components. Example techniques for calculating some of these components are briefly considered next. For clarity, these techniques are discussed with reference to the scoring engine 32.

A structural relationship between words or phrases can be used as a component of a similarity score, in accordance with the diagram 150. To evaluate the structural relationship, the scoring engine 32 can evaluate several types of linguistic relationship: visual identity, general phonetic identity, phonetic prefix relationship, structural identity, letterphonetic identity, etc. For example, "Folia" is visually identical to "Folia" and yields the score of 100. "Folia" and "Pholia" are (generally) phonetically identical, and yield the score of 97. "Folia" and "Pholianegra" correspond to a phonetic prefix full and split, and yield the score of 88. "Stargate" and "Starg8" are structurally identical, and yield the score of 95. "ABC" and "ABSee" have letterphonetic identity, and yield the score of 92.

As further illustrated in FIG. 3, similarity also can include a distinctiveness score. To this end, for a certain string S, the scoring engine 32 can determine how distinctive each of the prefix permutations of the string S is in a certain class. For example, for the string "Chicago," the scoring engine 32 may determine how many times the prefix "Ch" occurs in registered trademark terms, how many times the prefix "Chi" occurs, how many times the prefix "Chic" occurs, etc. To continue with this example, the score for "Ch" can be approximately 50,000, the score for "Chi" can be approximately 10,000, the score for "Chic" can be approximately 1,000, etc. These scores can collectively describe the distinctiveness for the string S, in one implementation. Depending on the scenario, the string S can include a sequence of alphanumeric characters or a certain pattern, such as "CHv+Cv+Gv," for example, where 'v' is a vowel.

In some implementations, the scoring engine 32 can evaluate the score separately for each relevant class. For example, the distinctiveness of "berry" is different in the food class than the distinctiveness in the clothing class. In other implementations, the scoring engine 32 can generate a composite score for the set of desired classes.

As another example, the scoring engine 32 can evaluate similarity of consonant patterns when evaluating the structural relationship. For example, a consonant pattern can be expressed as Rv+Sv+Lv+[ZS], where 'v' represents a vowel. This patterns matches the second word in "casa rosales" and the first word in "rosilez winery," for example. In some cases, consonant patterns also can be considered when automatically excluding certain candidate trademarks. For example, the last word in "preferred timeshare resales" matches the consonant pattern of Rv+Sv+Lv+[ZS], but "resales" can be recognized as a word existing in the language and excluded.

Figure 4:
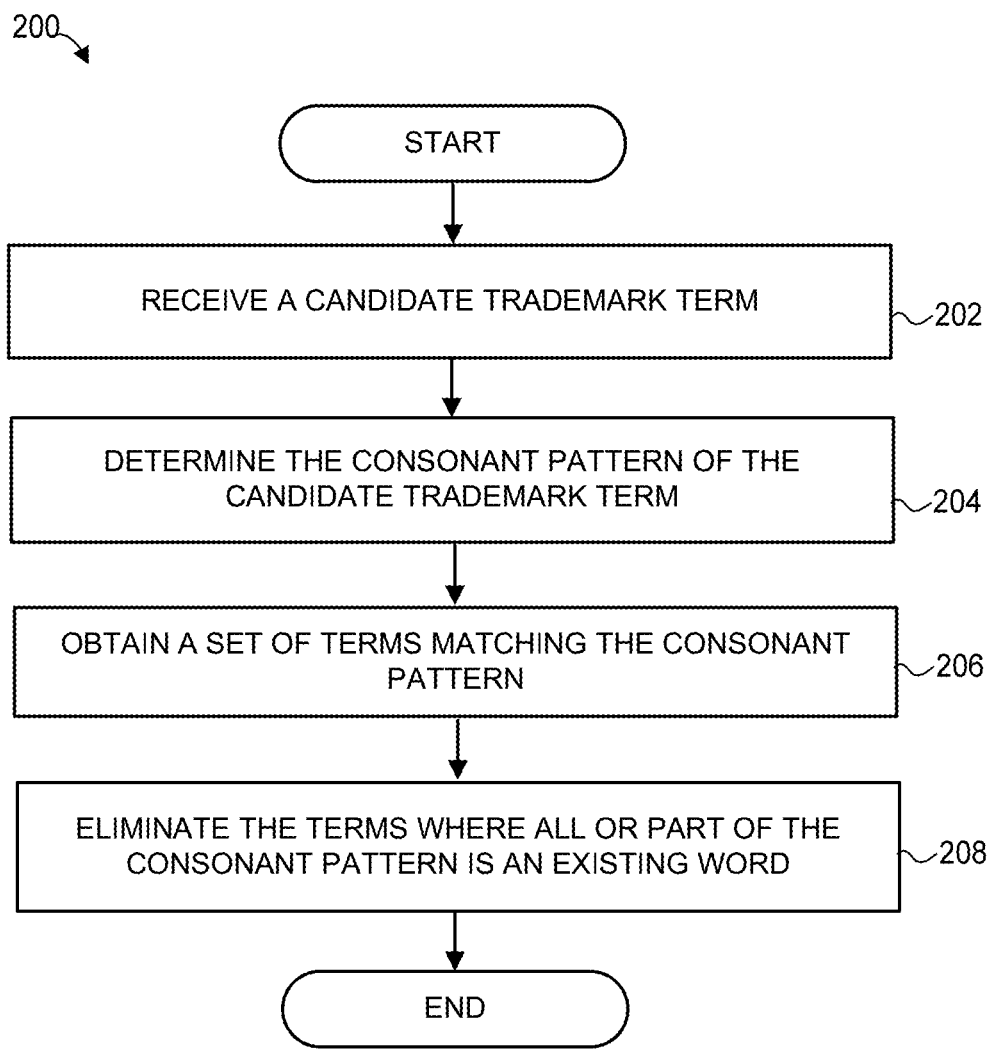
FIG. 4 is a flow diagram of an example method for excluding from consideration certain terms based on consonant pattern comparison, which can be used in the system of FIG. 1.

For additional clarity, FIG. 4 depicts a flow diagram of an example method 200 for excluding from consideration certain terms based on consonant pattern comparison. The method 200 begins at block 202, where a candidate trademark term is received. For example, the candidate trademark term can be received from the lexical term engine.

At block 204, the consonant pattern of the candidate trademark is determined. To this end, the vowels can be eliminated and leading consonants identified, in accordance with the principles of the corresponding language. Next, at block 206, a set of terms matching the consonant pattern is received. The terms where all or a part of the consonant pattern correspond to an existing word then are excluded at block 208. For example, as discussed above, the phrase "preferred timeshare resales" is excluded because "resales," matching the consonant pattern, is recognized as a word.

Figure 5:
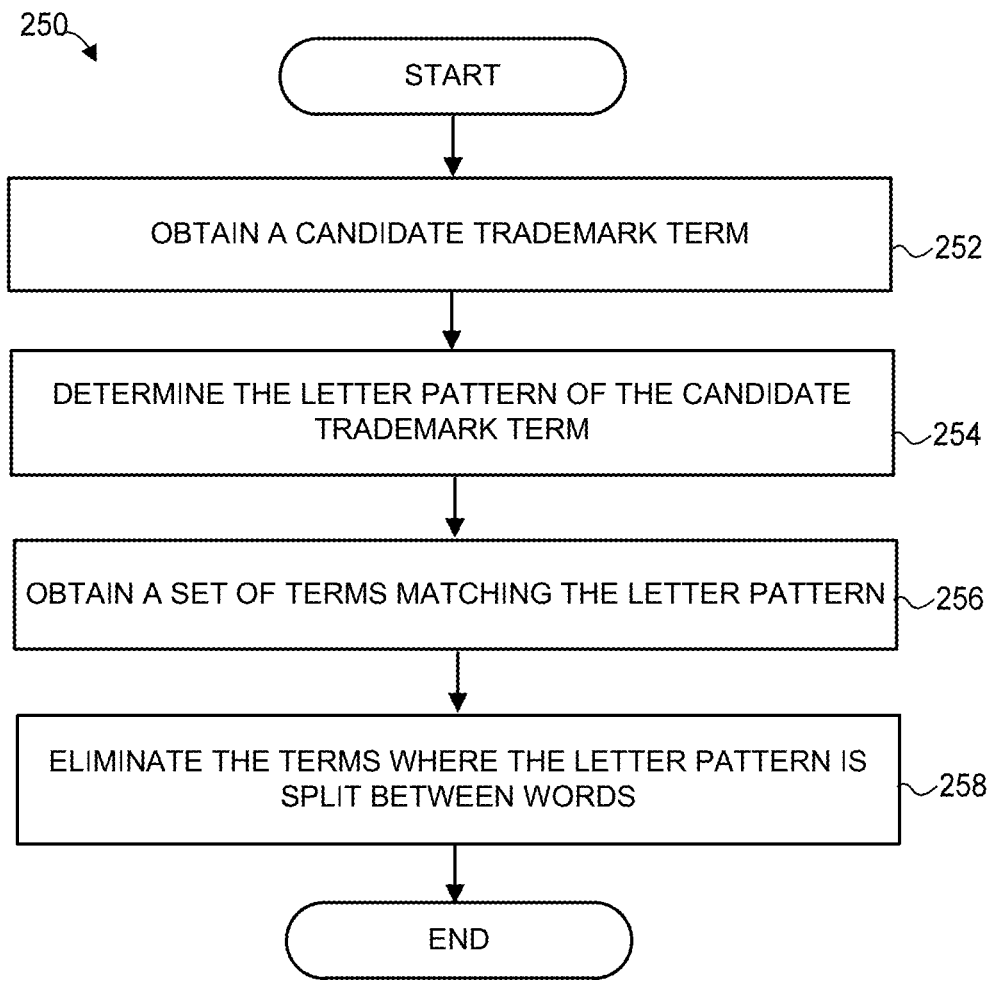
FIG. 5 is a flow diagram of an example method for excluding from consideration certain terms based on letter pattern comparison, which can be used in the system of FIG. 1.

Further, FIG. 5 illustrates a flow diagram of an example method 250 for excluding from consideration certain terms based on letter pattern comparison. This method begins at block 252, where a candidate trademark term is received, similar to the method 200 discussed above. The letter pattern of the candidate trademark term is identified at block 254. For example, the letter pattern in an example scenario is "RASIL." A set of terms matching the letter pattern are obtained at block 258, and the terms where the letter pattern is split between words are excluded at block 258. For example, the letter pattern "RASIL" occurs, among other terms, "nutrasilk." Because "rasil" straddles two words, "nutra" and "silk," the term "nutrasilk" is excluded.

Generating Namespace Visualizations

Figure 6:
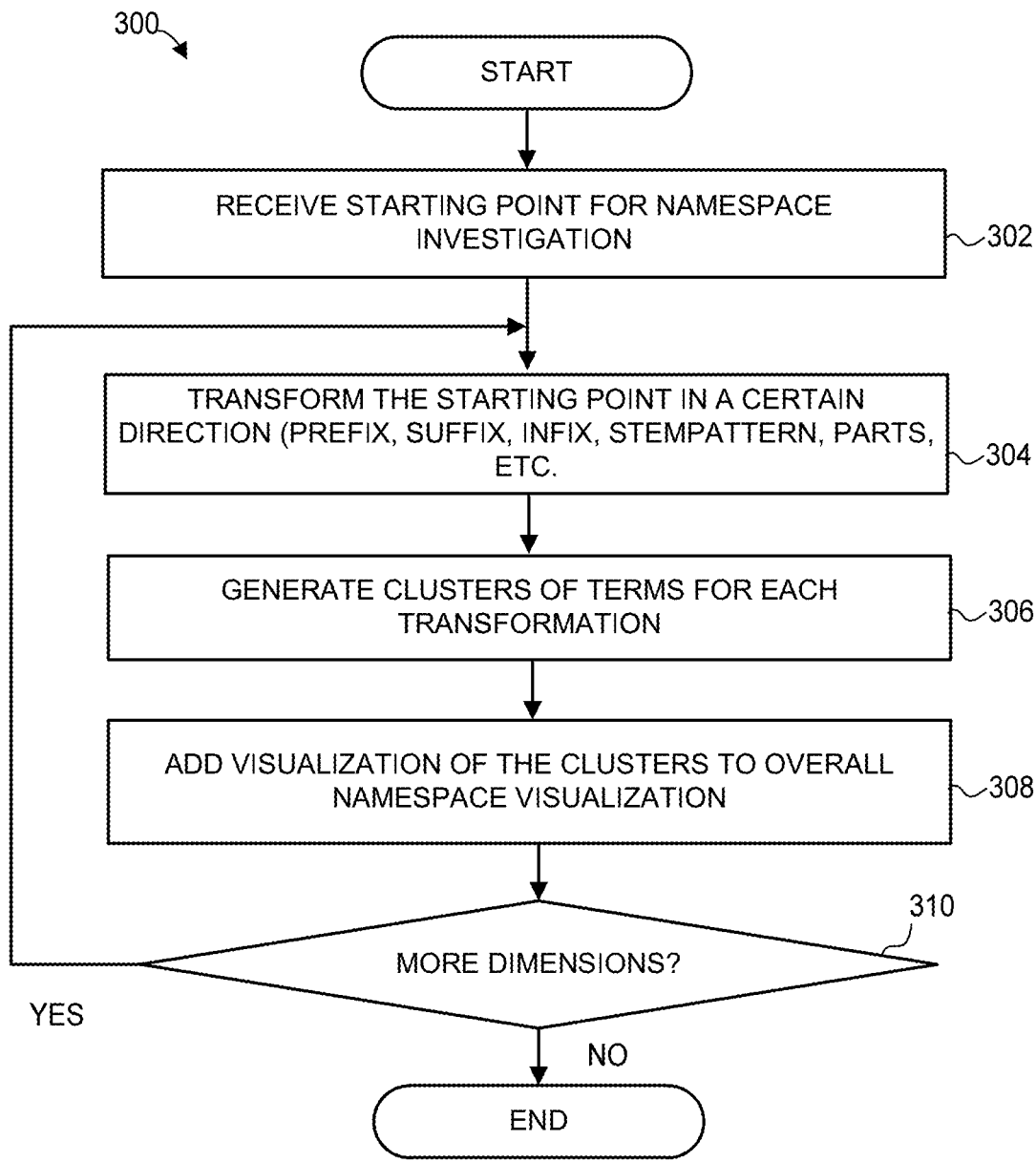
FIG. 6 is a flow diagram of an example method for generating namespace visualizations, which can be used in the system of FIG. 1.

Now referring to a flow diagram of an example method 300 in FIG. 6, the interface generator 34 (or another component operating in the system 10) in some implementations generates a visualization of the namespace of a certain term. Generally speaking, in accordance with this technique, the system 36 selects a certain alphanumeric string as a starting point, transforms the string along or more "dimensions" as discussed below, and evaluates the terms generated in accordance with these transformations.

Figure 10:
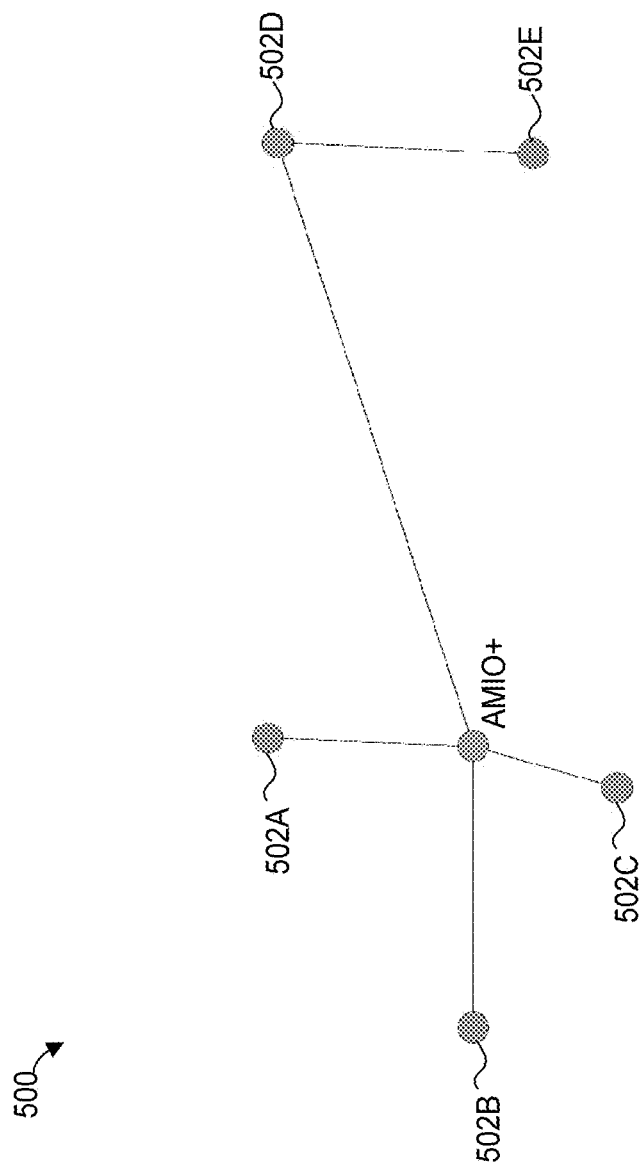
FIG. 10 is a diagram that illustrates one of the stages of generating a visualization of a namespace, which can be implemented as part of the method of FIG. 6.

The method 300 begins at block 302, where a set of one or more terms defining stem(s), concept(s), a pattern, etc. is received The term can correspond to a candidate trademark or an existing trademark. For example, A certain portion of the term is selected as a starting point for the interactive exploration of the namespace (block 303). Depending on the implementation, the system 36 may receive the portion of the term from the decision maker or select one automatically based on appropriate combination rules. In the example of FIG. 10, the selected portion of the term is the prefix "AMIO."

Figure 11:
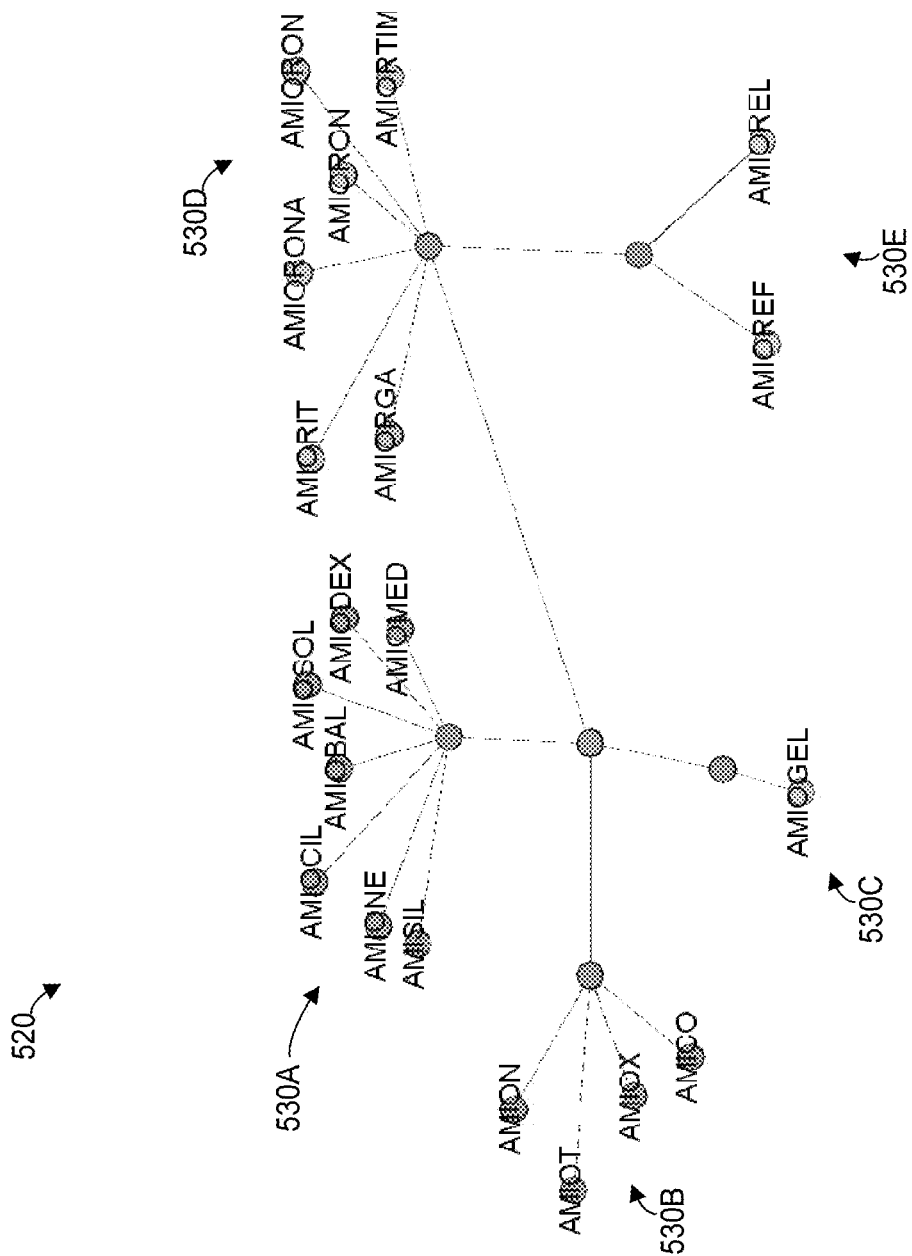
FIG. 11 is a diagram that illustrates another stage of generating a visualization of a namespace, which can be implemented as part of the method of FIG. 6.
Figure 12:
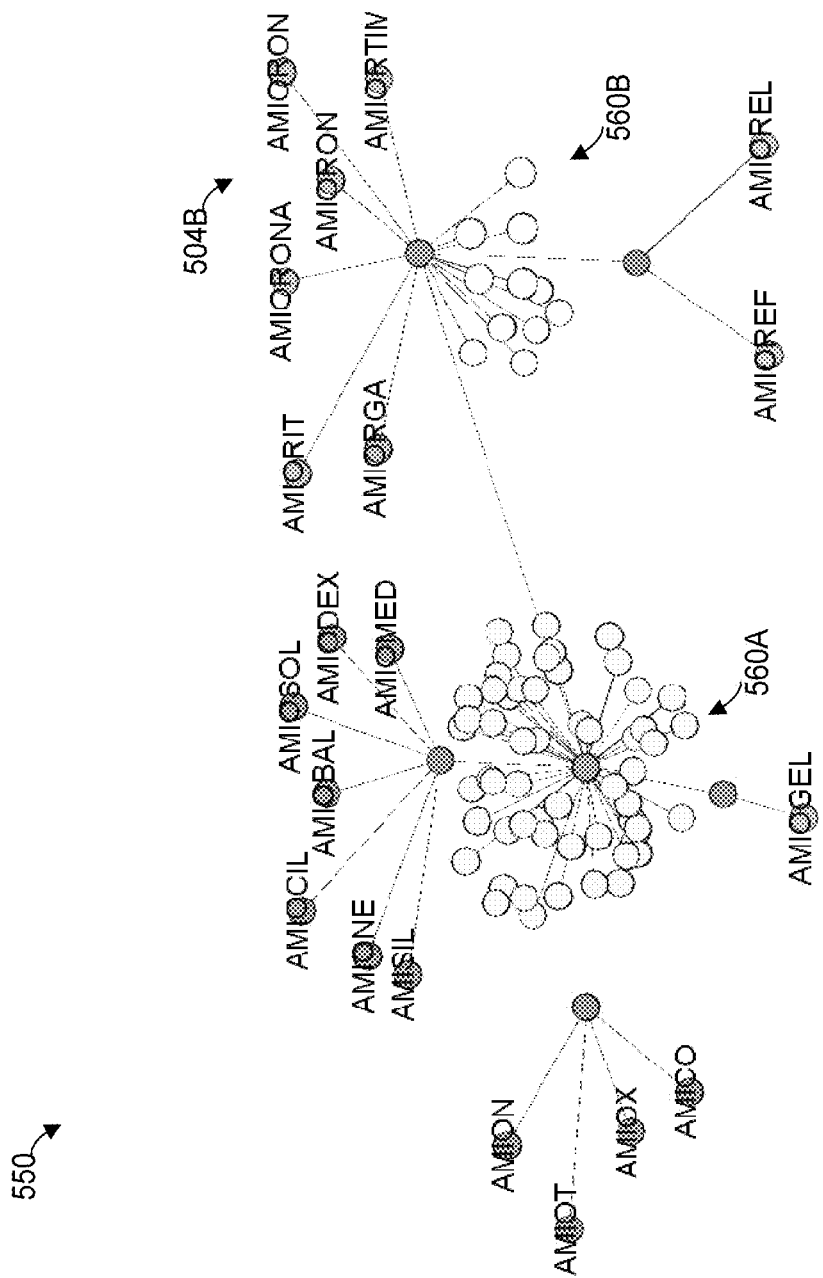
FIG. 12 is a diagram that illustrates yet another stage of generating a visualization of a namespace, which can be implemented as part of the method of FIG. 6.

At block 304, the starting point is transformed in a certain direction. Generally speaking, there are many possible transformations available for a typical alphanumeric string. The transformation can proceed along a prefix, suffix, infix, stem pattern, and/or other dimensions. Further, as illustrated in FIGS. 10-12, the transformations can include multiple steps along the same dimension, e.g., starting point+one letter from the received term, starting point+two letters from the received term, etc.

Clusters of terms for each transformation are generated at block 306. To this end, the system 36 can find existing trademarks that include the strings corresponding to the transformations generated at block 306. In another implementation, the system 36 finds existing trademarks that yield high proximity scores relative to each transformation.

At block 308, the interface generator 34 generates a visualization of the generated clusters. In one implementation, each transformation is depicted by a dot or a suitable icon of a certain color, each existing trademark is depicted by a dot or some other icon of another color, and the terms in the whitespace are depicted by dots or other icons of yet another color. Further, the interface generator 34 in some implementations makes the clusters interactive, so that the decision maker can collapse certain clusters, enlarge clusters to better view the text, annotate clusters, etc. Some of the differences between clusters of existing trademarks and clusters of terms in whitespace is discussed below with reference to FIG. 12.

If more dimensions are available for transformation, the flow returns to block 304. Otherwise, the method 300 proceeds completes upon completing block 308. When the flow returns to block 304, user feedback can cause the system 36 to prioritize transformation and/or emphasis in visualization. For example, if the user appears to respond positively to candidate trademarks related to a transformation corresponding to adding syllable "do" to the received term, the system can continue to transform along this dimension (e.g., by adding further syllables to "do") before performing a more basic transformation along a different dimension.

Figure 7:
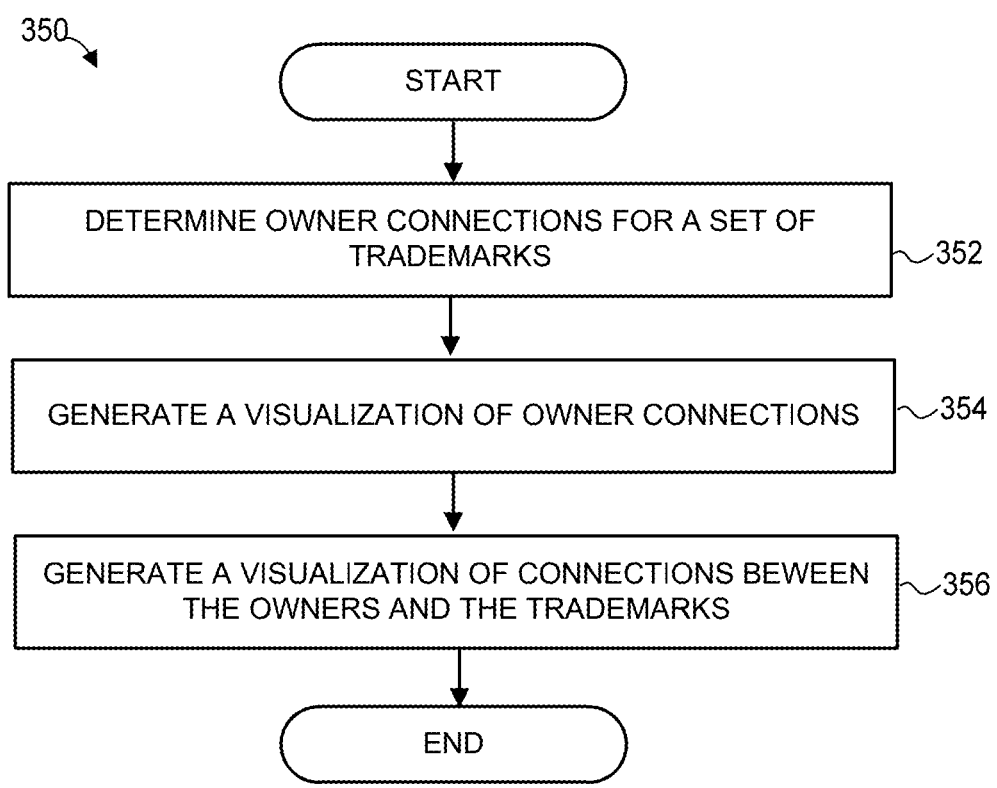
FIG. 7 is a flow diagram of an example method for generating a visualization of connections between owners and trademarks, which can be used in the system of FIG. 1.

FIG. 7 is a flow diagram of an example method 350 for generating a visualization of connections between owners and trademarks. Some decision makers may wish to know the conglomeration of companies that are related to owners of certain trademarks. For example, a certain company may have subsidiaries or otherwise related companies.

Similar to the method of FIG. 6, the method 350 can be implemented in the system 36, e.g., in the interface generator 34. The method 350 begins at block 352, where owner connections are determined, for a certain trademark or a set of trademarks. The system 36 can process newsfeeds, articles, trademark records (some of which may show multiple owners), and other documents.

At block 354, a visualization of the owner connections may be generated. For example, the interface generator 34 can illustrate each determined connection between two companies with a line. Then, at block 356, a visualization of the connections between several owners and several trademarks can be provided in a single view. Connections between companies can be illustrated using lines of one type, and ownership of trademarks can be illustrated by drawing lines of another type between icons representing companies and icons representing trademarks, for example. For a certain string S, (which, as indicated above, can define a pattern) this visualization can convey to the decision maker that several related companies own a large number of trademarks that include the S. In view of this visualization, the decision maker can may choose a particular strategy with respect to the terms still available in the corresponding namespace (try to obtain a trademark in this namespace, avoid this namespace, etc.).

Example User Interfaces

Figure 8:
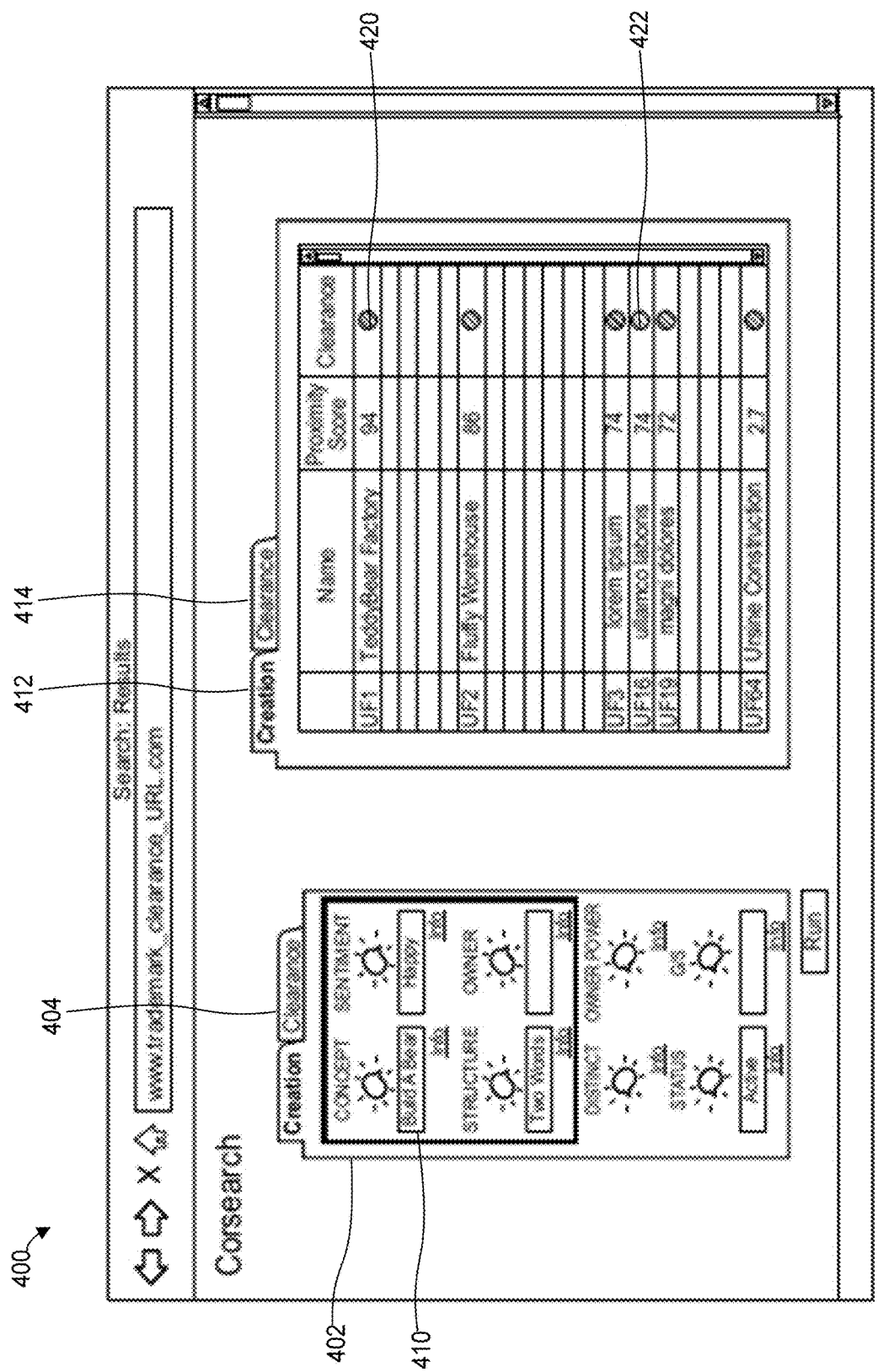
FIG. 8 is a diagram of an example user interface screen for specifying creation criteria and viewing clearance estimates for candidate trademarks, which can be provided via a display of the client device of FIG. 1.

FIG. 8 is depicts an example user interface screen 400 which the system 36 can generate to receive creation criteria from a user and provide clearance estimates for candidate trademarks. The user interface screen 400 can be provided in the window of a web browser executing on the client device 50, for example. The user interface screen 400 includes tabs 402 and 404 for specifying creation criteria and clearance criteria, respectively. In this example view, the tab 402 is activated, and the user can specify a concept, a sentiment, a structure, etc. when requesting candidate trademarks. The user interface screen 400 further includes tabs 412 and 414 for displaying creation and clearance output data. As illustrated in FIG. 8, the list of automatically generated candidate trademarks includes multiple results ranked according to the proximity scores. As discussed above, the proximity scores are numerical metrics indicative of how closely the candidate trademark corresponds to the criteria the user specified via the tab 402. The list of automatically generated candidate trademarks also includes indication of the determined likelihoods of clearance. In this example implementation, the system 346 provides these indicators as icons 420, 422, etc. The icon 420 may be green to indicate that the candidate trademark is likely to clear, whereas the icon 422 may be yellow or red to indicate that the candidate trademark is not likely to clear.

Figure 9:
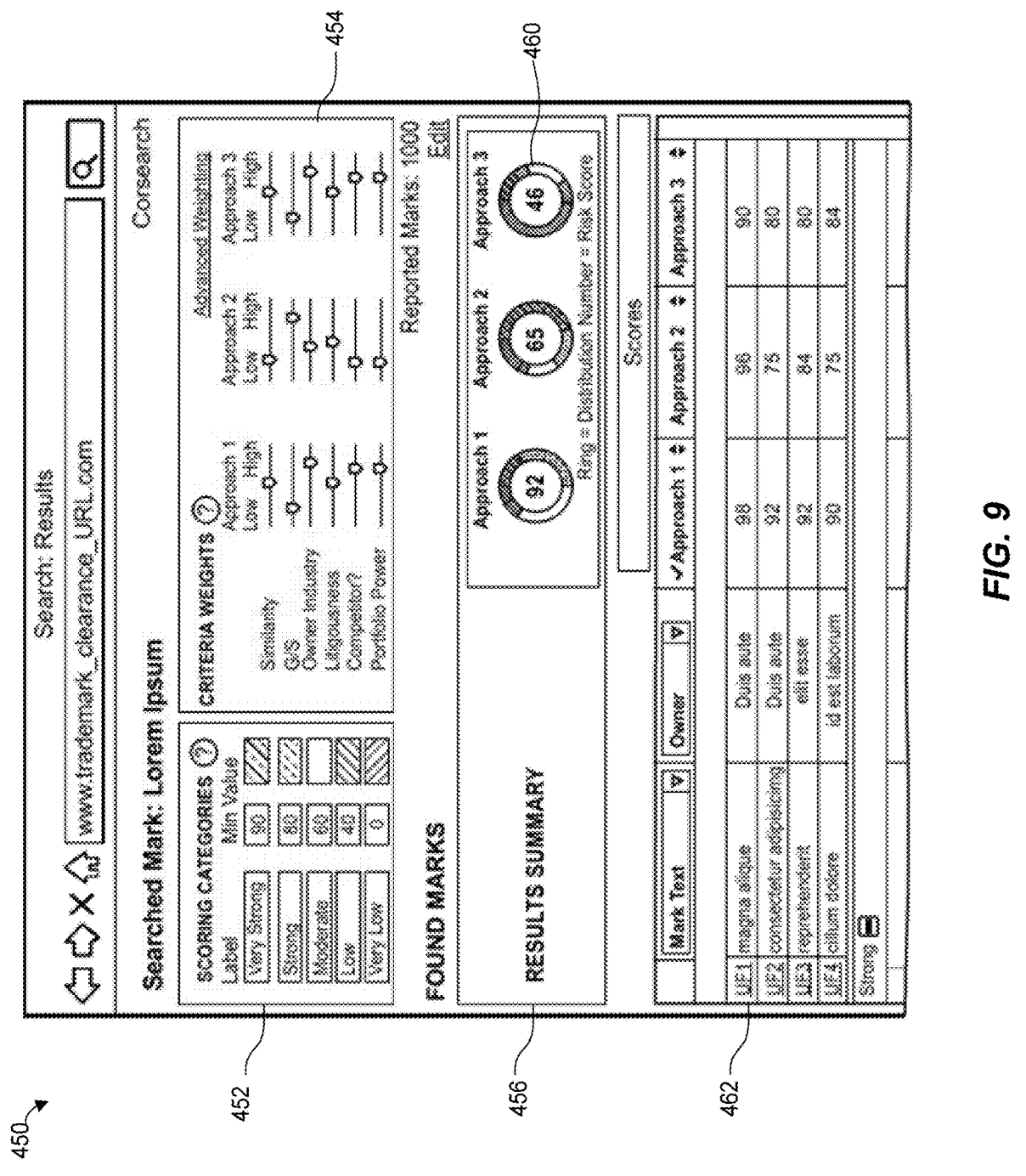

FIG. 9 is depicts another example user interface screen 450 which the system 36 can generate to provide clearance estimates for candidate trademarks. As one example, the user interface screen 450 includes controls for specifying how a certain candidate trademark should be scored relative to the existing trademarks. The user interface screen 450 allows the user to adopt multiple perspectives by specifying criteria weights according to multiple approaches.

The user interface screen 450 can include user controls to receive selections of labels for use in visualizing the results of generating candidate trademarks. In the tab 452, the user can specify that he or she wishes to see the "very strong" proximity scores of 90 or above with a certain color, the "strong" proximity scores of 80 or above with another color, etc. Further, the user can specify weights for some of the criteria discussed above via a tab 454.

The user interface screen 450 also can include a results summary section 456, where the system 36 can summarize the results of generating and evaluating candidate trademarks. As illustrated in FIG. 9, the user can specify multiple (in this case, three) sets of values for various criteria via the tab 454. In particular, the user here specifies that the portfolio power criterion should be weighed relatively heavily in accordance with the first approach and the third approach, and relatively lightly in accordance with the second approach. Accordingly, the system 36 can provide visual summaries in the form of rings. The ring 460 for example illustrates the summary for approach 3. The ring 460 encloses an indicator of the risk score of 46. The ring 460 is made up of segments of different color, where the length of each segment corresponds to the proportion of trademarks with the scores represented by the color of the segment.

FIG. 10 is a diagram 500 that illustrates one of the stages of generating a visualization of a namespace. In this example the decision maker chooses to begin his or her exploration with a starting point, the prefix "AMIO." FIG. 10 illustrates five example transformations of the prefix AMIO, represented by dots 502. The transformations 502A-C are related to structure. The transformation 502A corresponds to a structure that has two syllables in addition to the received term ("AMIO"), the transformation 502B corresponds to a structure that has one syllable in addition to the received term, closed with a consonant, and transformation 502C corresponds to using a certain vowel pattern with the received term" During visualization, the structural transformations can be illustrated on one (in this case, left) side of the starting point "AMIO."

The transformations 502D and 502E correspond to adding letters from the received term to the starting point. In particular, the transformation 502D corresponds to augmenting the term "AMIO" to "AMIOR," and the transformation 502E corresponds to augmenting the term "AMIOR" further to "AMIORE." During visualization, the additional letter-based transformations can be illustrated on one (in this case, right) side of the starting point "AMIO."

FIG. 11 illustrates another stage of generating a visualization of a namespace. As illustrated in a diagram 520, the system 36 can display clusters 530A-E for each respective transformation 502A-E. Each cluster includes icons representing existing trademarks that include the string of the corresponding transformation (or, in another implementation, yield high proximity scores relative to these transformations).

FIG. 12 illustrates the next stage of generating a visualization of a namespace. At this point, the system 36 can display clusters of names that are not found in databases listing the existing trademarks. In the diagram 550, each icon in clusters 560A and 560B represents a transformation or a series of transformations that yield a certain term that appears to be available for use as a trademark term. In some implementations, a term also must satisfy a certain selection threshold to be included in the cluster 560A or 560B. For example, each term must yield at least a certain proximity score relative to the corresponding transformation.

In general, the clusters can correspond to transformation along prefix, suffix, infix, stem-pattern, and other dimensions. The interface generator 34 may simulate a distribution of the clusters in a three-dimensional space, so that the user can more quickly understand which portions of the namespace are more crowded, and which portions are less crowded. In some implementations, the interface generator 34 can apply different colors, shading, intensity, etc. to some of the points in the cluster to convey additional information about the registered trademarks. For example, certain dots may be of one color to indicate a "regular" trademark for a certain transformation, whereas other dots may be of another color to indicate trademarks owned by highly litigious entities, for example. As another example, a certain color may indicate that the registered trademark is owned by a competitor of the party exploring the namespace. More generally, the interface generator 34 can use multiple colors to convey any suitable property of the registered trademark or its owner.

For further clarity, FIGS. 13-20 illustrate an example sequence of user interface screens the system 36 can present to a user in a certain scenario.

Figure 13:
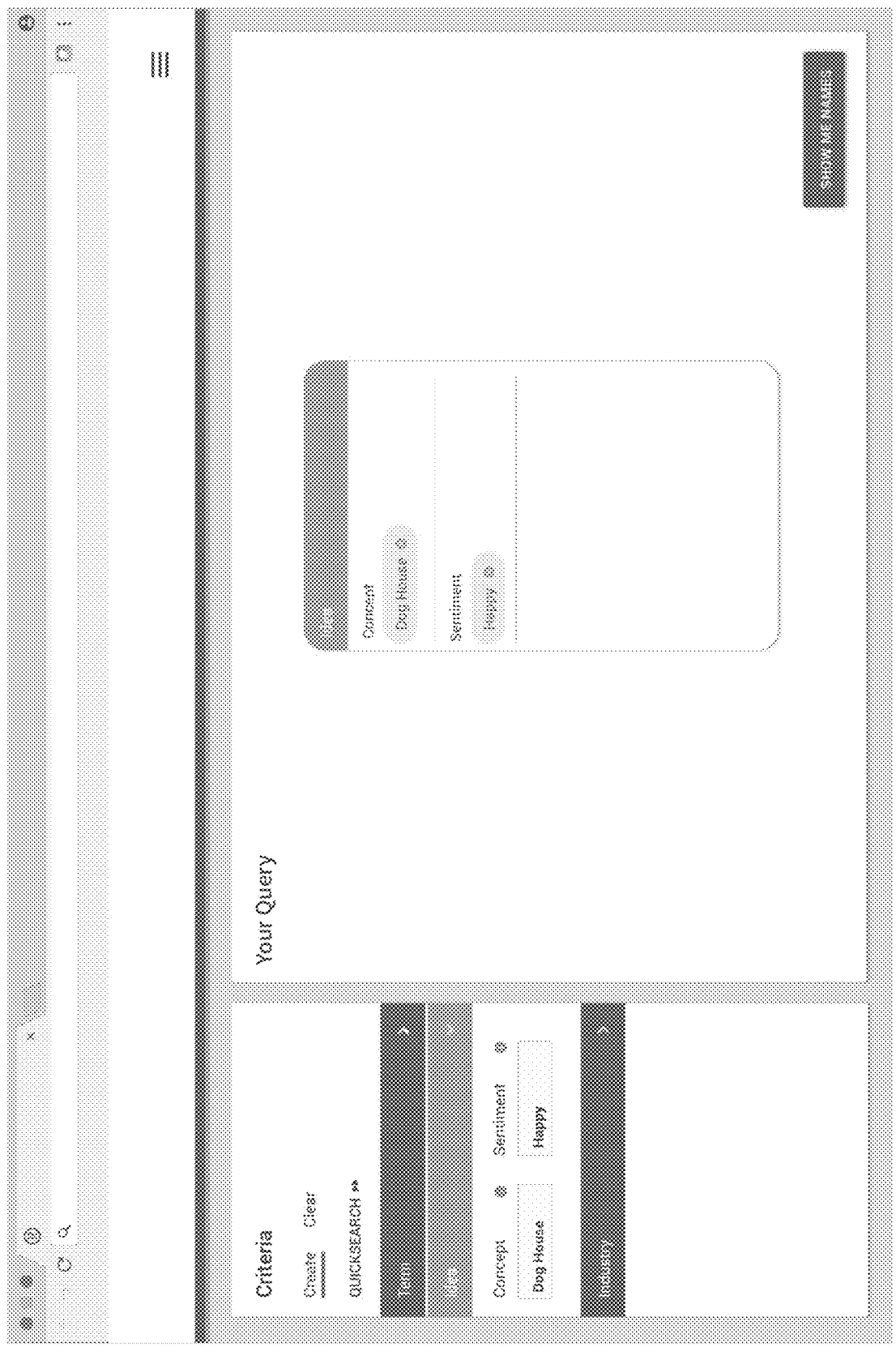

First, FIG. 13 illustrates an example user interface screen via which a user can begin to build a query for candidate trademarks. The user in this example chooses "dog house" as the concept and "happy" and the sentiment. The system 36 may display this part of the input (which can be referred to as "an idea") in the Query Panel.

Figure 14:
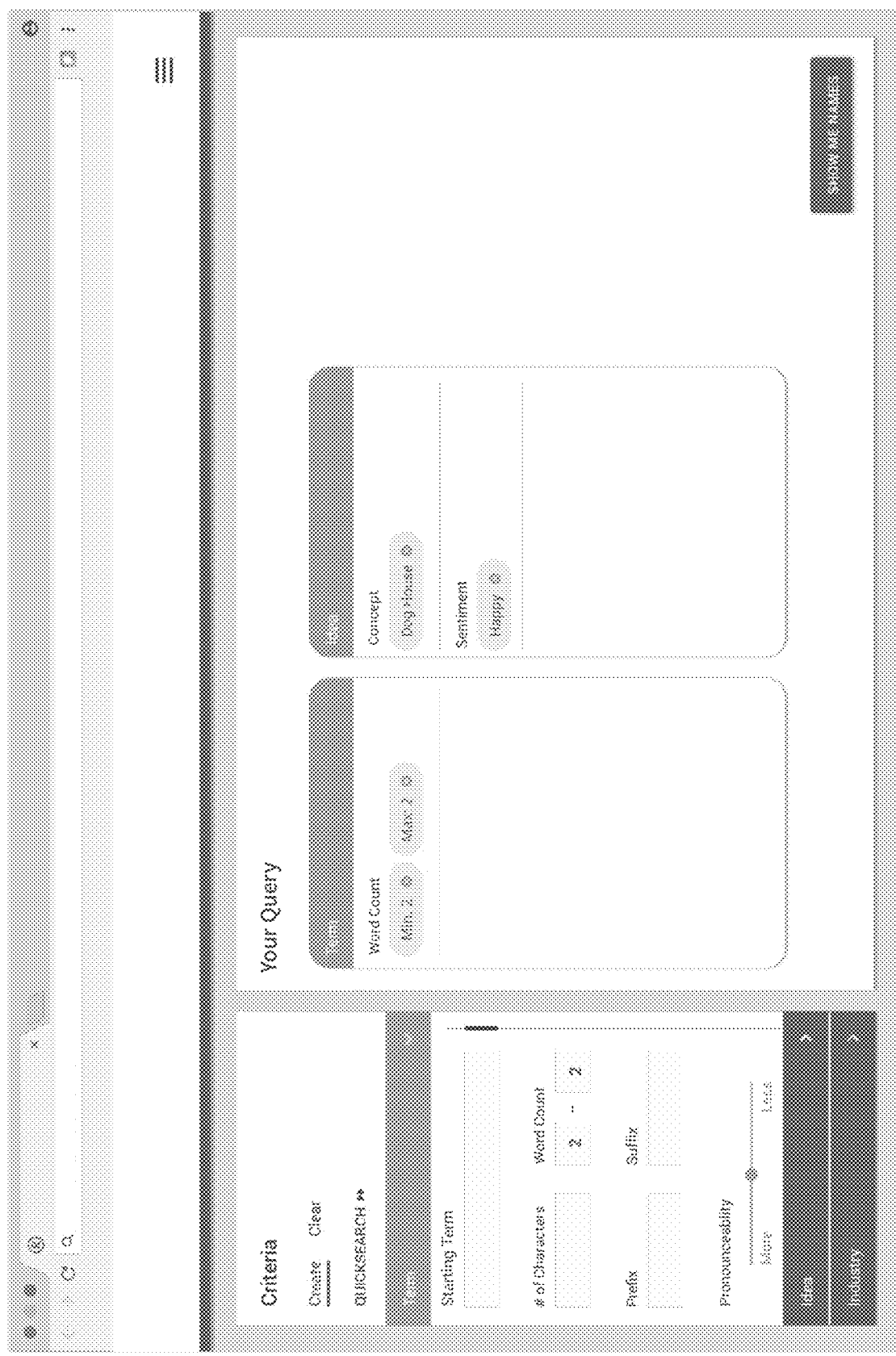

Next, FIG. 14 illustrates an example user interface screen via which the user can specify certain criteria. In particular, the user specifies the word count WC as 2<=WC<=2, i.e., indicates that the candidate trademark must include two words. The user then actuates the control labeled "show me names." In response, the user may display certain candidate trademarks along with the corresponding proximity scores and likelihoods of clearance (FIG. 15).

Figure 16:
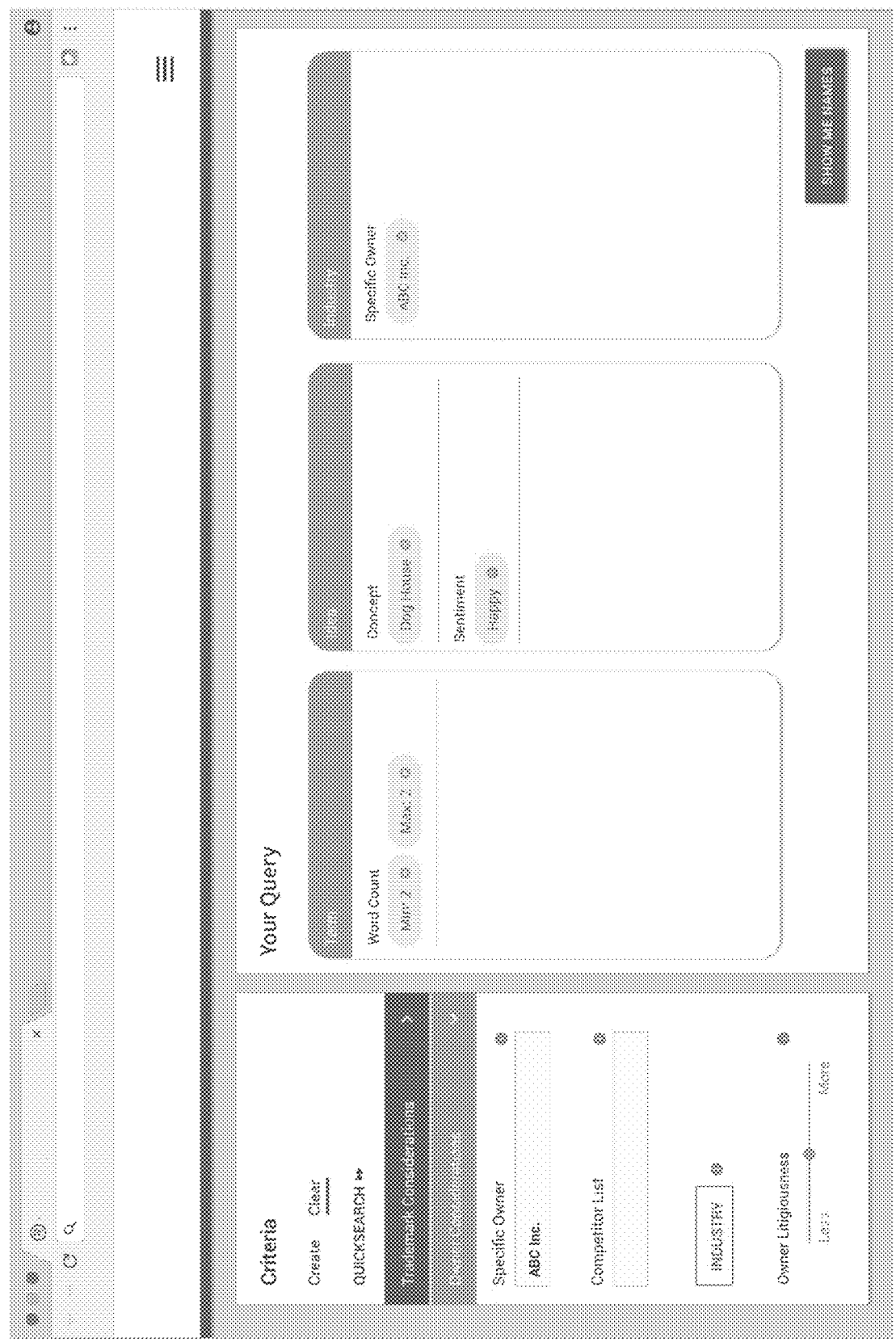
Figure 17:
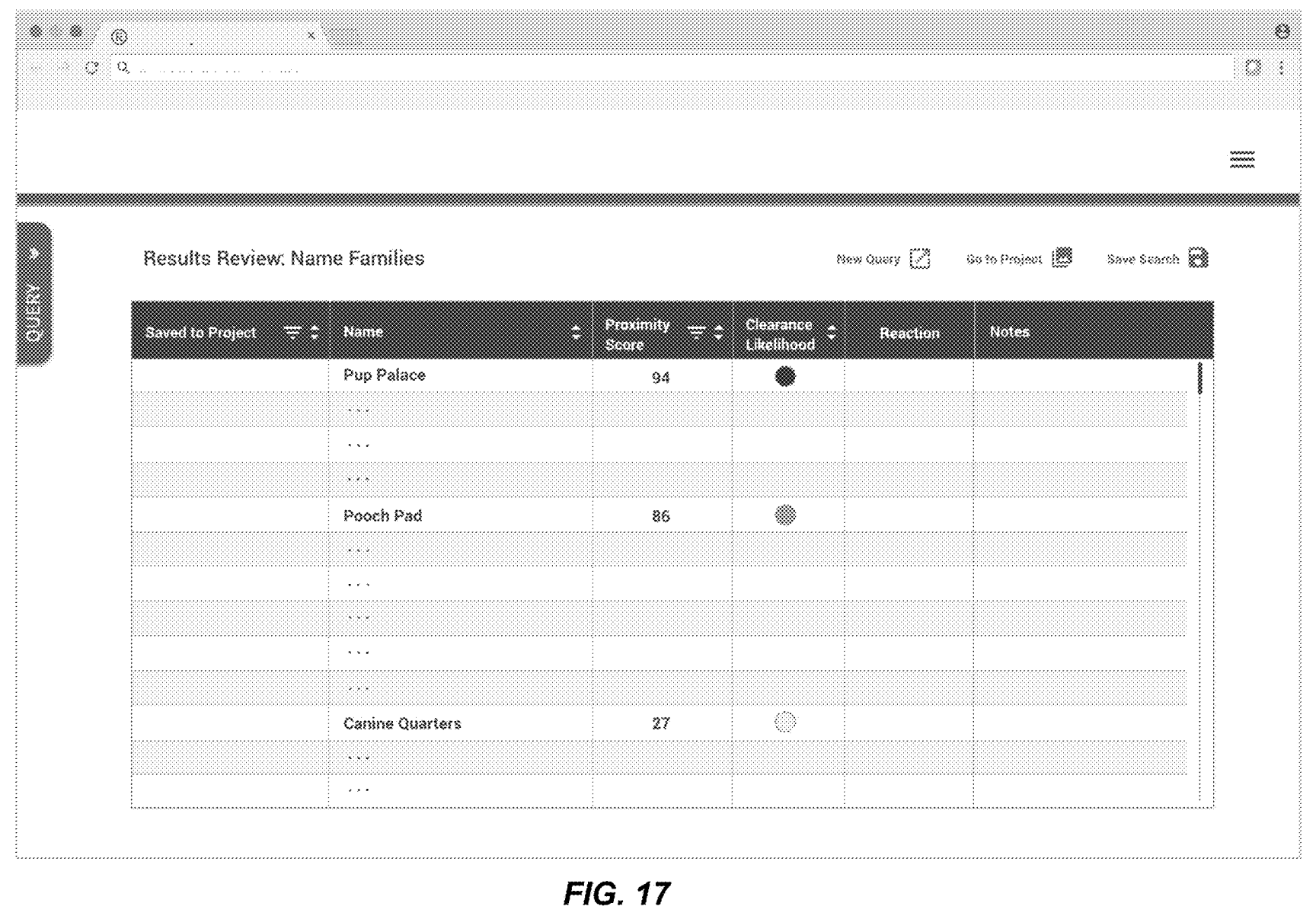

FIG. 16 illustrates an example user interface screen via which the user can specify an owner ("ABC Inc.") to be used as an additional constraint. The user thus asks the system 36 to reduce the likelihood of clearance for each trademark owned by a certain company, person, etc. The corresponding response is illustrated in FIG. 17.

Figure 18:
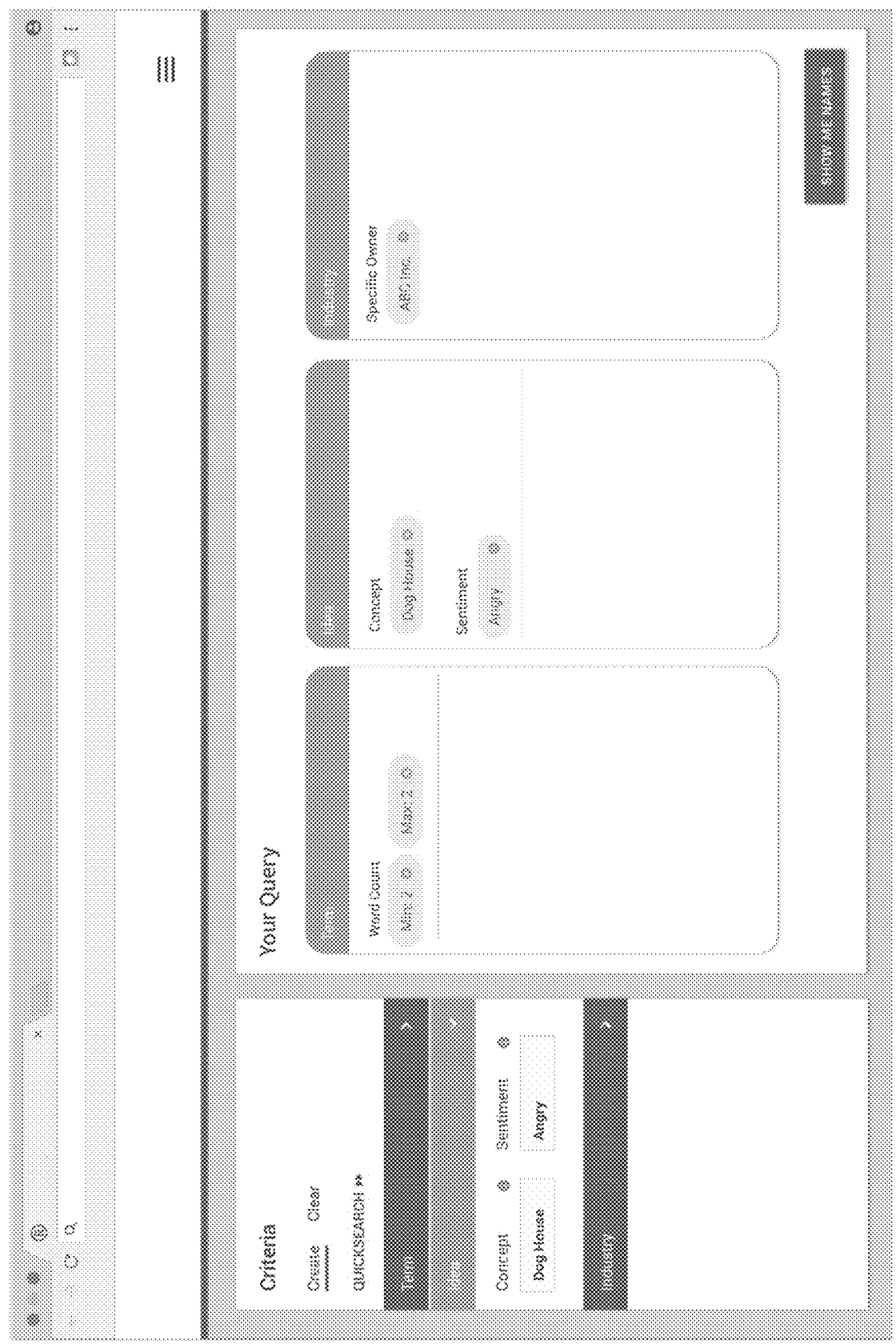

FIG. 18 illustrates the situation where the user changes the initially provided sentiment to "angry." As illustrated in FIG. 19, this change results in different results produced by the system 36.

Finally, FIG. 20 illustrates an example user interface screen via which the user can provide feedback in the form of respective reaction scores for one or several candidate trademarks. In this example implementation, the user can move a slider to assign a reaction score to a candidate mark. The user also can enter notes and/or view details pertaining to the proximity and likelihood of clearance scores.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network may include, but is not limited to, any combination of a LAN, a MAN, a WAN, a mobile, a wired or wireless network, a private network, or a virtual private network. Moreover, it is understood that any number of client computers or display devices are supported and may be in communication with the server 12.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 10 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for generating and evaluating candidate trademarks through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for automatically providing suggestions for trademarks that identify and distinguish a source of goods of one party from those of others, the method comprising:
   providing, by one or more processors, a user interface for specifying a plurality of criteria via respective interactive controls, the plurality of criteria including a level of pronounceability, and a concept or sentiment, and a stem or structure;
   searching, by the one or more processors, one or more databases to identify lexical units related to the plurality of criteria;
   combining, by the one or more processors, two or more of the identified lexical units by applying a set of combination rules to generate candidate trademark terms, including calculating respective relationship scores indicative of how closely the candidate trademark terms satisfy the plurality of criteria;
   ranking, by the one or more processors, the candidate trademark terms based on the relationship scores to generate an ordered list; and
   providing, by the one or more processors, the ordered list of the candidate trademark terms and indications of the respective relationship scores via the user interface;
   wherein applying the set of combination rules to the identified lexical units to generate the candidate trademark terms further includes:
   automatically retrieving, from the one or more databases, existing trademarks related to the plurality of criteria, the one or more databases including a registered trademark database storing information for registered trademarks including serial numbers, terms of word marks, indicators of goods and service classes, filing dates, ownership information, and live or dead indicators; and
   calculating clearance likelihood scores for the candidate trademark terms relative to the existing trademarks retrieved from the one or more databases to determine likelihoods of clearance, the clearance likelihood scores indicative of how close the candidate trademark terms are to the existing trademarks, wherein calculating clearance likelihood scores comprises determining the distinctiveness of the candidate trademark terms in a relevant class, wherein determining the distinctiveness comprises determining how many times a plurality of prefixes of at least one of the candidate trademark terms occurs in registered trademarks in the relevant class;
   wherein ranking the candidate trademark terms is further based on the determined likelihoods of clearance.

2. The method of claim 1, further comprising:
   receiving, via the user interface, user feedback regarding at least some of the candidate trademark terms; and
   re-executing at least some of the searching, the combining, or the ranking steps in view of the user feedback.

3. The method of claim 1, wherein providing the user interface for specifying the plurality of criteria including providing interactive controls for specifying relative weights of the criteria.

4. The method of claim 1, further comprising:
   receiving an alphanumeric term via one of the interactive controls; and
   wherein calculating the relationship score for a certain one of the candidate trademark terms includes generating a similarity metric based on linguistic relationship between the candidate trademark term and the received alphanumeric term.

5. The method of claim 4, wherein the linguistic relationship is based on one or more of (i) visual similarity, (ii) phonetic similarity, (iii) structural similarity, (iv) phonetic prefix presence, or (v) letter-phonetic similarity.

6. The method of claim 1, wherein searching the one or more databases includes searching for the lexical units corresponding to the specified concept.

7. The method of claim 1, wherein searching the one or more databases includes searching for the lexical units corresponding to the specified sentiment.

8. The method of claim 1, wherein applying the set of combination rules to the identified lexical units includes merging the specified stem with the identified lexical units.

9. The method of claim 1, wherein calculating the respective relationship scores includes calculating pronounceability metrics.

10. The method of claim 1, wherein providing the user interface for specifying the plurality of criteria includes providing an interactive control for specifying an industry, wherein the generated candidate trademark terms are related to the specified industry.

11. The method of claim 1, wherein providing the user interface for specifying the plurality of criteria includes providing an interactive control for specifying a trademark portfolio, wherein the generated candidate trademark terms are related to the specified trademark portfolio.

12. The method of claim 1, wherein the structure of the candidate trademark terms is expressed in terms of words or syllables.

13. The method of claim 1, wherein generating the candidate trademark terms includes using one or more lexical units that do not have an established meaning in language.

14. The method of claim 1, wherein combining two or more of the identified lexical units according to the set of combination rules includes applying a rule to avoid long sequences of vowels or consonants.

15. The method of claim 1, wherein combining two or more of the identified lexical units according to the set of combination rules includes applying a language-specific combination rule so that the candidate trademark terms conform with general expectations of speakers of the language.

16. The method of claim 1, wherein combining two or more of the identified lexical units according to the set of combination rules includes applying a rule specified by a user.

17. The method of claim 1, wherein calculating the respective relationship scores includes applying a pronounceability model that provides estimates for a particular language.

18. The method of claim 1, wherein calculating the respective relationship scores includes applying a pronounceability model that provides estimates for a particular region.

19. The method of claim 1 wherein a composite distinctiveness score is generated for a set of classes.

20. A computing system for automatically providing suggestions for trademarks that identify and distinguish a source of goods of one party from those of others, the computing system comprising:
 a server system comprising one or more processors and a memory storing instructions that, when executed by the one or more processors, cause the server system to:
 provide a user interface for specifying a plurality of criteria via respective interactive controls, the plurality of criteria including a level of pronounceability, and a concept or sentiment, and a stem or structure;
 search one or more databases to identify lexical units related to the plurality of criteria, the one or more databases including a registered trademark database storing information for registered trademarks including serial numbers, terms of word marks, indicators of goods and service classes, filing dates, ownership information, and live or dead indicator;
 combine two or more of the identified lexical units according to a set of combination rules to generate candidate trademark terms, including calculating respective relationship scores indicative of how closely the candidate trademark terms satisfy the plurality of criteria;
 the plurality of criteria including a clearance likelihood score indicative of how close the candidate trademark terms are to existing trademarks retrieved from the registered trademark database, wherein calculating clearance likelihood scores comprises determining the distinctiveness of the candidate trademark terms in a relevant class, wherein determining the distinctiveness comprises determining how many times a plurality of prefixes of at least one of the candidate trademark terms occurs in registered trademarks in the relevant class;
 rank the candidate trademark terms based on the relationship scores to generate an ordered list; and
 provide the ordered list of the candidate trademark terms and indications of the respective relationship scores via the user interface.

21. The computing system of claim 20 wherein a composite distinctiveness score is generated for a set of classes.

* * * * *